United States Patent
Dal Mutto et al.

(10) Patent No.: US 11,868,863 B2
(45) Date of Patent: Jan. 9, 2024

(54) SYSTEMS AND METHODS FOR JOINT LEARNING OF COMPLEX VISUAL INSPECTION TASKS USING COMPUTER VISION

(71) Applicant: PACKSIZE LLC, Salt Lake City, UT (US)

(72) Inventors: Carlo Dal Mutto, Sunnyvale, CA (US); Francesco Peruch, Sunnyvale, CA (US); Alexander Ou, Sunnyvale, CA (US); Robert Hayes, Palo Alto, CA (US)

(73) Assignee: Packsize LLC, Salt Lake City, UT (US)

( * ) Notice: Subject to any disclaimer, the term of this patent is extended or adjusted under 35 U.S.C. 154(b) by 0 days.

(21) Appl. No.: 17/965,428

(22) Filed: Oct. 13, 2022

(65) Prior Publication Data

US 2023/0177400 A1 Jun. 8, 2023

Related U.S. Application Data

(63) Continuation of application No. 16/721,501, filed on Dec. 19, 2019, now Pat. No. 11,508,050.
(Continued)

(51) Int. Cl.
*G06N 20/10* (2019.01)
*G06T 7/50* (2017.01)
(Continued)

(52) U.S. Cl.
CPC ......... *G06N 20/10* (2019.01); *G06F 18/2411* (2023.01); *G06N 3/04* (2013.01);
(Continued)

(58) Field of Classification Search
CPC ...... G06N 20/10; G06N 3/04; G06F 18/2411; G06T 7/0002; G06T 7/50; G06T 7/90;
(Continued)

(56) References Cited

U.S. PATENT DOCUMENTS

| 6,493,637 B1 * | 12/2002 | Steeg | ............ G16B 30/10 |
| | | | 702/19 |
| 10,691,979 B2 | 6/2020 | Dal et al. | |

(Continued)

OTHER PUBLICATIONS

Cruz et al., "Neural Algebra of Classifiers", 2018 IEEE Winter Conference on Applications of Computer Vision (WACV), IEEE, Mar. 12, 2018 (Mar. 12, 2018), pp. 729-737.
(Continued)

*Primary Examiner* — Xuemei G Chen
(74) *Attorney, Agent, or Firm* — WORKMAN NYDEGGER

(57) ABSTRACT

A method for performing automatic visual inspection includes: capturing visual information of an object using a scanning system including a plurality of cameras; extracting, by a computing system including a processor and memory, one or more feature maps from the visual information using one or more feature extractors; classifying, by the computing system, the object by supplying the one or more feature maps to a complex classifier to compute a classification of the object, the complex classifier including: a plurality of simple classifiers, each simple classifier of the plurality of simple classifiers being configured to compute outputs representing a characteristic of the object; and one or more logical operators configured to combine the outputs of the simple classifiers to compute the classification of the object; and outputting, by the computing system, the classification of the object as a result of the automatic visual inspection.

20 Claims, 14 Drawing Sheets

Related U.S. Application Data

(60) Provisional application No. 62/782,163, filed on Dec. 19, 2018.

(51) Int. Cl.
| | |
|---|---|
| *G06T 7/90* | (2017.01) |
| *G06N 3/04* | (2023.01) |
| *G06T 7/00* | (2017.01) |
| *G06V 30/148* | (2022.01) |
| *G06F 18/2411* | (2023.01) |
| *G06V 10/764* | (2022.01) |
| *G06V 10/82* | (2022.01) |
| *G06V 20/80* | (2022.01) |

(52) U.S. Cl.
CPC .............. *G06T 7/0002* (2013.01); *G06T 7/50* (2017.01); *G06T 7/90* (2017.01); *G06V 10/765* (2022.01); *G06V 10/82* (2022.01); *G06V 20/80* (2022.01); *G06V 30/153* (2022.01)

(58) Field of Classification Search
CPC ...... G06V 10/765; G06V 10/82; G06V 20/80; G06V 30/153
See application file for complete search history.

(56) References Cited

U.S. PATENT DOCUMENTS

| | | | |
|---|---|---|---|
| 2003/0055614 A1* | 3/2003 | Pelikan | ................... G06N 3/126 703/2 |
| 2005/0259866 A1* | 11/2005 | Jacobs | ............. G06V 30/18057 382/229 |
| 2007/0127825 A1 | 6/2007 | Ivanov | |
| 2008/0247609 A1 | 10/2008 | Feris et al. | |
| 2009/0150309 A1 | 6/2009 | Chapelle et al. | |
| 2009/0220148 A1* | 9/2009 | Levy | ........................ G06T 5/005 382/163 |
| 2010/0014584 A1* | 1/2010 | Feder | ..................... H04N 19/18 375/240.12 |
| 2010/0246912 A1 | 9/2010 | Periaswamy et al. | |
| 2011/0081073 A1 | 4/2011 | Skipper et al. | |
| 2011/0251989 A1 | 10/2011 | Kraaij et al. | |
| 2012/0041575 A1 | 2/2012 | Maeda et al. | |
| 2012/0259803 A1 | 10/2012 | Whitlow et al. | |
| 2014/0072213 A1 | 3/2014 | Paiton et al. | |
| 2016/0179162 A1* | 6/2016 | Eastep | ..................... G06F 1/329 713/320 |
| 2017/0068844 A1* | 3/2017 | Friedland | ............. G06V 10/764 |
| 2017/0069216 A1 | 3/2017 | Vaughan et al. | |
| 2017/0323376 A1 | 11/2017 | Glaser et al. | |
| 2018/0005118 A1 | 1/2018 | Kapoor et al. | |
| 2018/0046649 A1 | 2/2018 | Dal et al. | |
| 2018/0047208 A1 | 2/2018 | Marin et al. | |
| 2018/0130255 A1 | 5/2018 | Hazeghi et al. | |
| 2018/0157899 A1 | 6/2018 | Ku et al. | |
| 2018/0205552 A1* | 7/2018 | Struttmann | ............. G06F 21/78 |
| 2018/0211373 A1 | 7/2018 | Stoppa et al. | |
| 2018/0237899 A1 | 8/2018 | Lu et al. | |
| 2018/0322623 A1 | 11/2018 | Memo et al. | |
| 2019/0279115 A1 | 9/2019 | Park | |
| 2020/0184254 A1 | 6/2020 | Finkelshtein et al. | |
| 2020/0372625 A1 | 11/2020 | Dal Mutto et al. | |
| 2021/0081491 A1* | 3/2021 | Daido | ................... G06F 9/3887 |
| 2021/0094179 A1* | 4/2021 | You | ........................ B25J 9/1666 |

OTHER PUBLICATIONS

Final Office Action received for U.S. Appl. No. 16/721,501, dated Nov. 24, 2021, 14 pages.

International Search Report and Written Opinion received for PCT Patent Application No. PCT/US19/67606, dated Apr. 21, 2020, 9 pages.

Lampert et al., "Attribute-Based Classification for Zero-Shot Visual Object Categorization", IEEE Transactions on Pattern Analysis and Machine Intelligence, IEEE Computer Society, USA, vol. 36, No. 3, Mar. 1, 2014 (Mar. 1, 2014), pp. 453-465.

Misra et al., "From Red Wine to Red Tomato: Composition with Context", 2017 IEEE Conference on Computer Vision and Pattern Recognition (CVPR), IEEE Computer Society, US, Jul. 21, 2017, pp. 1160-1169.

Non-Final Office Action received for U.S. Appl. No. 16/721,501, dated Apr. 29, 2021, 14 pages.

Non-Final Office Action received for U.S. Appl. No. 16/721,501, dated Mar. 8, 2022, 14 pages.

Notice of Allowance received for U.S. Appl. No. 16/721,501, dated Jul. 25, 2022, 8 pages.

* cited by examiner

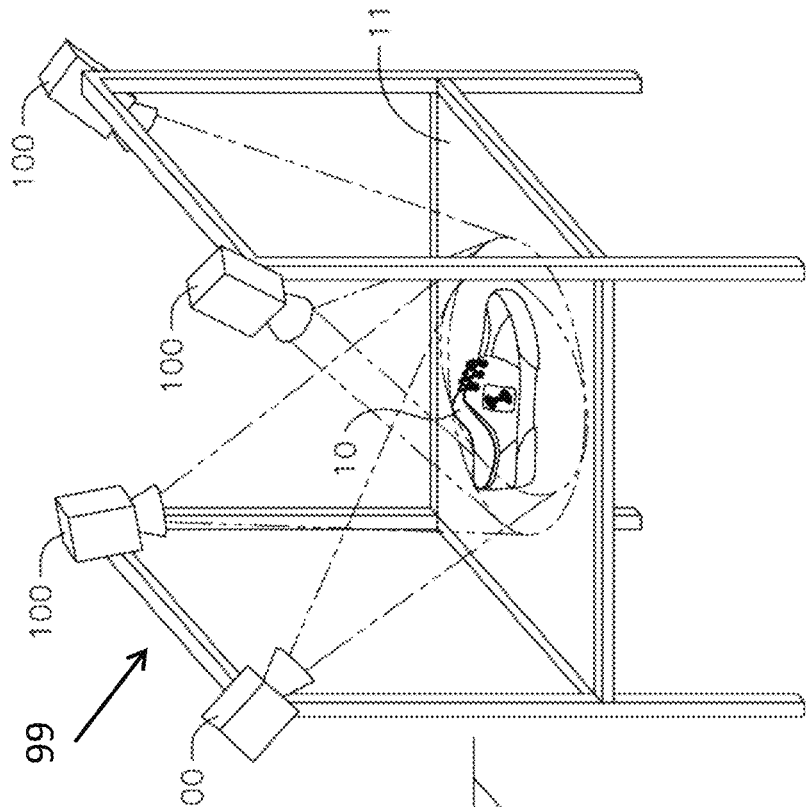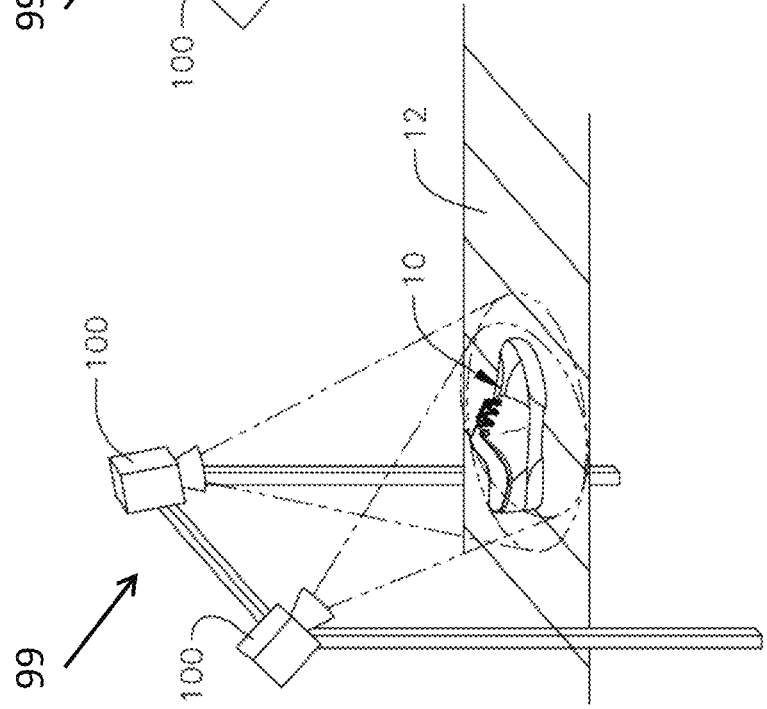

SYSTEMS AND METHODS FOR JOINT LEARNING OF COMPLEX VISUAL INSPECTION TASKS USING COMPUTER VISION

CROSS-REFERENCE TO RELATED APPLICATION(S)

This application is a continuation of U.S. patent application Ser. No. 16/721,501 filed on Dec. 19, 2019 and entitled "SYSTEMS AND METHODS FOR JOINT LEARNING OF COMPLEX VISUAL INSPECTION TASKS USING COMPUTER VISION," which application claims the benefit of U.S. Provisional Patent Application No. 62/782,163, filed on Dec. 19, 2018, and entitled "SYSTEMS AND METHODS FOR JOINT LEARNING OF COMPLEX VISUAL INSPECTION TASKS USING COMPUTER VISION." The entire contents of each of the above applications is incorporated herein by reference in their entireties.

FIELD

Aspects of embodiments of the present invention relate to the field of visual object inspection, including the use of computer vision techniques to automate visual inspection tasks.

BACKGROUND

Complex inspection tasks from visual information are very common in manufacturing and logistics. A complex inspection task is constituted by multiple (two or more) simple inspection tasks, which are combined with some logic. For example, when inspecting a manufactured object for quality monitoring or quality control in a manufacturing environment, several different characteristics of the object may be measured and the resulting measurements may be compared against quality standards to determine if the object, as a whole, meets those standards. For example, in the case of shoe manufacturing, an overall determination of whether to accept or reject a particular manufactured shoe may depend on a combination of simple inspection tasks considering externally visible aspects of the shoe, such as uniformity of the stitching, locations of the stitches, and alignment of the logos and other design elements, defects in the material (e.g., holes and cracks), and the like. The, complex, overall decision of whether the shoe passes or fails quality control depends on a combination of the underlying simple inspection tasks, such as requiring that the shoes pass all of the simple inspection tasks.

Generally, such complex inspection tasks are performed manually by a human inspector, who evaluates the manufactured objects in accordance with particular procedures.

SUMMARY

Aspects of embodiments of the present invention relate to systems and methods for automatically performing visual inspection of objects and automatically computing inspection results.

According to one embodiment of the present invention, a method for performing automatic visual inspection includes: capturing visual information of an object using a scanning system including a plurality of cameras; extracting, by a computing system including a processor and memory, one or more feature maps from the visual information using one or more feature extractors; classifying, by the computing system, the object by supplying the one or more feature maps to a complex classifier to compute a classification of the object, the complex classifier including: a plurality of simple classifiers, each simple classifier of the plurality of simple classifiers being configured to compute outputs representing a characteristic of the object; and one or more logical operators configured to combine the outputs of the simple classifiers to compute the classification of the object; and outputting, by the computing system, the classification of the object as a result of the automatic visual inspection.

The one or more feature extractors may include one or more convolutional neural networks.

The plurality of simple classifiers may include one or more neural networks.

The plurality of simple classifiers may include one or more support vector machines, and at least one logical operation may be configured to combine an output of the one or more neural networks and an output of the one or more support vector machines.

The plurality of simple classifiers may include a regression model.

The plurality of simple classifiers may include a label-based classifier configured to perform on text detection.

Each simple classifier of the plurality of simple classifiers may be configured by a corresponding threshold parameter of a plurality of threshold parameters, wherein the threshold parameters are jointly trained.

The threshold parameters may be jointly trained by: sampling a parameter space to select a plurality of sets of threshold parameters to configure the simple classifiers; computing a True Positive rate (TPr) and a False Positive rate (FPr) for each set of threshold parameters of the plurality of sets of threshold parameters by: configuring the complex classifier by configuring the simple classifiers based on the set of threshold parameters; and computing the TPr and the FPr for the configuration by supplying the configured complex classifier with a validation set of data; and identifying a Pareto front including best performing sets of configuration parameters in accordance with the TPr and FPr for each set of the sets of configuration parameters; and selecting a set of configuration parameters from the Pareto front in accordance with a rule set in accordance with a domain.

The visual information may include color images, grayscale images, or depth maps.

The visual information may include at least one depth map.

The at least one depth map may be captured by a depth camera system of the plurality of cameras.

The depth camera system may include: a time-of-flight depth camera; a structured light depth camera; a stereo depth camera including: at least two color cameras; a stereo depth camera including: at least two color cameras; and a color projector; a stereo depth camera including: at least two infrared cameras; or a stereo depth camera including: at least two infrared cameras; an infrared projector; and a color camera.

The plurality of simple classifiers may include a classifier based on mathematical modeling of the depth map.

A feature map of the one or more feature maps may be provided as input to at least two of the plurality of simple classifiers.

The classification of the object may include an identification of a category of a plurality of categories of objects.

The classification of the object may include an identification of one or more properties of the object based on the visual information.

According to one embodiment of the present invention, a visual inspection system includes a processor and memory, the processor being configured to perform the steps of the above methods.

According to one embodiment of the present invention, a computer program includes instructions which, when executed by a computer, cause the computer to carry out the steps of the above methods.

According to one embodiment of the present invention, a visual inspection system includes: a scanner system including a plurality of cameras; a computing system connected to the scanner system over a computer network, the computing system including a processor and memory storing instructions that, when executed by the processor, cause the processor to: control the scanner system to capture visual information of an object; extract one or more feature maps from the visual information using one or more feature extractors; classify, by the computing system, the object by supplying the one or more feature maps to a complex classifier to compute a classification of the object, the complex classifier including: a plurality of simple classifiers, each simple classifier of the plurality of simple classifiers being configured to compute outputs representing a characteristic of the object; and one or more logical operators configured to combine the outputs of the simple classifiers to compute the classification of the object; and output, by the computing system, the classification of the object as a result of an automatic visual inspection of the object.

The visual inspection system may be configured to perform the steps of the above method.

The scanner system may include at least one color camera.

The scanner system may include at least one depth camera.

The visual inspection system may further include a user device including a display device, the user device being configured to display: the classification of the object; and at least one characteristic of the object computed by at least one simple classifier of the plurality of simple classifiers.

The computing system may be configured to control a conveyor system to redirect movement of the object in accordance with the classification.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, together with the specification, illustrate exemplary embodiments of the present invention, and, together with the description, serve to explain the principles of the present invention.

FIG. 5A is a schematic diagram of a scanning system configured to scan objects on a conveyor belt according to one embodiment of the present invention.

FIG. 5B is a schematic diagram of a scanning system according to one embodiment of the present invention configured to scan stationary objects (e.g., on a table).

DETAILED DESCRIPTION

Figure 1A:
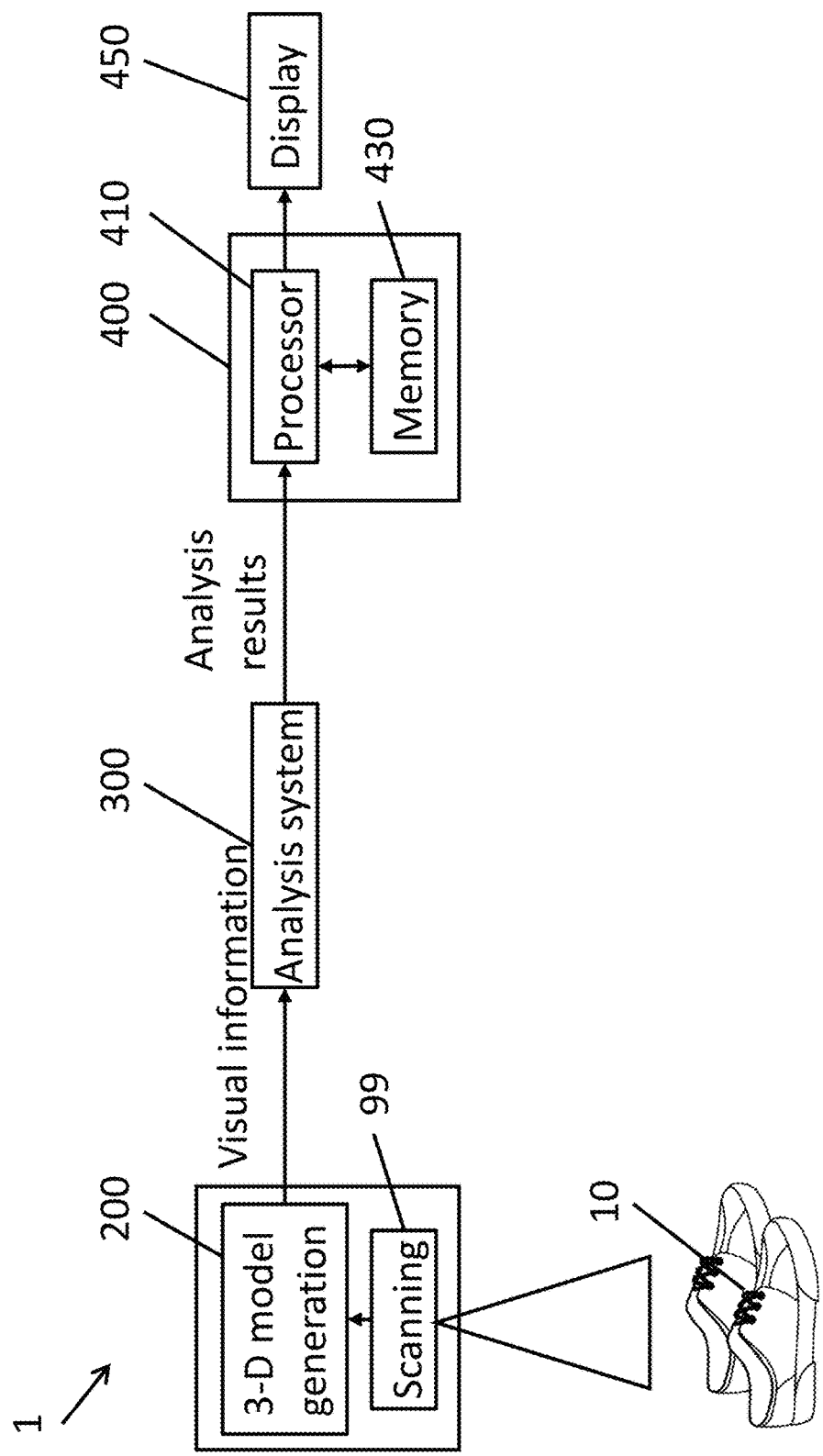
FIG. 1A is a schematic block diagram of a system for automatically scanning and inspecting objects according to one embodiment of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

Aspects of embodiments of the present invention are directed to performing complex inspection tasks based on visual information. The visual information may be acquired using a visual acquisition system (e.g., one or more cameras), and the information collected by such system is processed in order to solve inspection tasks which are characterized by a combination of simple decisions.

In more detail, aspects of embodiments of the present invention relate to automatic systems and methods to acquire visual information and to process the acquired visual information to solve complex visual inspection tasks. Some aspects of embodiments of the present invention are directed to systems and methods for machine learning techniques to automatically train a machine learning system to jointly learn to process visual information to solve the complex visual inspection tasks.

As used herein, the term "complex inspection task" will be used to refer to an inspection task that is the combination of a plurality (two or more) simple inspection tasks, where the simple inspection tasks are combined with some logic (e.g., Boolean or binary logic, arithmetic, fuzzy, . . . ) (see, e.g., Klir, G., & Yuan, B. (1995). *Fuzzy sets and fuzzy logic* (Vol. 4). New Jersey: Prentice Hall.). The term "visual inspection task" will be used herein to refer to inspection tasks that are evaluated using visual information, and complex visual inspection tasks may refer to complex tasks that are evaluated using visual information. As used herein, the term "simple inspection task" is used to refer to inspection tasks that a human can objectively and clearly evaluate consistently and with high confidence (e.g., inspection tasks that have little or no ambiguity). In addition, such "simple inspection tasks" may also be evaluated or performed by a "simple classifier," which is used herein to refer to a trained machine learning algorithm that can perform a simple inspection task to output a classification describing one characteristic of the input with high accuracy and robustly under the expected range of inputs. Multiple simple classifiers may be combined with logical operators to create a "complex classifier" for automatically performing or evaluating a complex inspection task.

One example is the inspection of the quality of the stitches in a manufactured shoe. The output of such an example inspection task is a PASS value or a FAIL value, which may depend on whether or not the quality of the stitches is acceptable. One way of performing such a task is to identify the maker or brand (1) of the shoe, the model (2) of the shoe, the color (3) of the shoe, and the size (4) of the shoe, retrieve the expected appearance of an item with such parameters (make, model, color, and size) and compare the expected appearance of the stitching to the actual captured appearance from the visual information (5). This example of a complex task includes five simple tasks, which are solved jointly in order to obtain a solution for the complex task of inspecting the quality of the stitches in the manufactured shoe. Additional inspection tasks may also be added, such as inspecting the quality of the eyelets and inspecting the quality of the surface of the shoe upper. As another example, a complex task may further include identifying a category of the object being analyzed, which may be of use in the case of a substantially heterogenous environment. For example, a heterogenous manufacturing line or logistics facility may process a wide range of different types of goods, such as shoes, boots, sporting equipment, clothing, food, beverages, and the like.

Another example of a complex inspection task is that of non-stackable pallet packages (NSP) in the field of logistics. In this case, a palleted package is said to be an NSP if the package is on a pallet (1), and if at least one of the following conditions is met: (2) the top of the package is not stable; (3) there is a sign or label on the exterior of the package that specifies that it is NSP; or (4) the contents of the package are fragile (e.g., a television). This complex task includes four simple tasks, which, analogously to the example of the shoe, is jointly solved in order to obtain a solution for the complex task.

As it is possible to infer from these two above examples, complex inspection tasks are very common in both the logistics and the manufacturing fields.

While traditionally human operators have been tasked with determining solutions to such complex inspection tasks, systems and methods for automatic computation of solutions to complex inspection tasks can improve consistency and reliability while also reducing cost.

As noted above, some embodiments of the present invention relate to performing visual inspection tasks by applying computer vision techniques to visual information, which may include images (e.g., 2-D images), videos (e.g., sequences of 2-D images), or more complex representations, such as 3-D models (e.g., captured or reconstructed from 2-D images).

The term "visual acquisition system" will be used herein to refer to a system that is used to acquire the visual information, where the visual acquisition system may include one or more cameras, an illumination system, a processing component, and some input/output (I/O) components.

According to some embodiments of the present invention, once the visual information is acquired, the visual information is automatically processed by an analysis agent, which may include a trained machine learning module that is trained to evaluate the complex inspection task based on the acquired visual information. The analysis agent may also use some handcrafted (e.g., human-programmed) heuristics to perform the complex inspection tasks.

Complex Task Inspection System

Figure 1B:
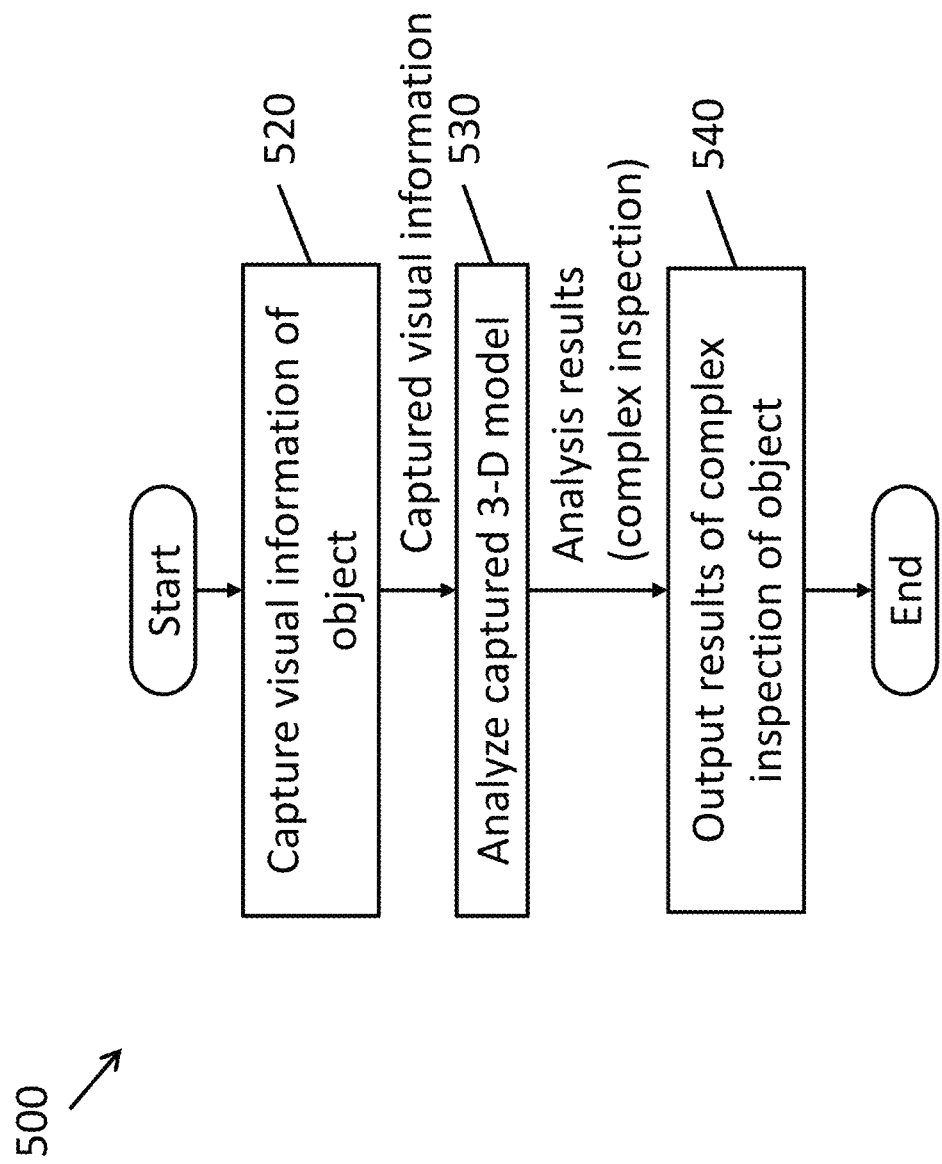
FIG. 1B is a flowchart of a method for scanning an object and displaying inspection results according to one embodiment of the present invention.

FIG. 1A is a schematic block diagram of a system for automatically scanning and inspecting objects according to one embodiment of the present invention. FIG. 1B is a flowchart of a method for scanning an object and displaying inspection results according to one embodiment of the present invention.

As shown in FIGS. 1A and 1B, according to one embodiment an inspection system 1 includes a 3-D scanner or scanning system 99, which is configured to capture images of an object 10 captured by the scanning system 99 in operation 520. An analysis system 300 inspects the object 10 based on captured visual information in operation 530. The visual information may include the images captured by the scanning system (e.g., monochrome or grayscale, color, and depth map images) and may also include a 3-D model generated by the 3-D model generation module 200 based on the images captured of the object by the scanning system 99.

The analysis results generated by the analysis system 300, may then be output in operation 540 to a user device 400. In some embodiments of the present invention, the user device 400 includes a processor 410 and memory 430, where the memory 430 stores instructions to control the processor 410 to maintain information (e.g., lists) regarding the particular object that is scanned, such as the identity of the object and the analysis results or inspection results (e.g., whether the object passed or failed the complex inspection task). The user device 400 may also be used to control a display device 450, which may display information to a user, such as the analysis results, including whether or not the object 10 passed the inspection and, if not, information about the nature of the failure.

In some embodiments of the present invention, the analysis results are output in operation 540 to control machinery in an environment. For example, in some embodiments implemented in a manufacturing setting, when a particular object is inspected and detected by the analysis agent 300 as being defective, the output is used to control a conveyor system or other actuators within the manufacturing setting to remove the defective item from the stream of goods produced (e.g., to manipulate a diverter to redirect the defective item).

Visual Acquisition Systems

Aspects of embodiments of the present invention are well suited for, but not limited to, circumstances in which the items to be analyzed may be characterized by their surface colors (or "textures") and geometry, including the size of the object (although there might be some variation between different instances of the same item or good). In many embodiments of the present invention, this type color and shape of information can be used to automate the identification of different items (e.g., identifying different modes of shoes that may be present on a same manufacturing line) and classification of the object (e.g., as "failing" or "passing" inspection or as being "non-stackable package" or "stackable package"). One component of automated object identification systems is a 3-D scanning system that is able to acquire geometry and color information. Because of the volumetric nature of common goods, in some embodiments, the 3-D scanning is performed by aggregating information from a multitude of 3-D scanners 100 at different vantagepoints. Therefore, a scanning system 99 may include one or more 3-D scanners or depth cameras 100.

Some aspects of embodiments of the present invention relate to gathering geometric (shape) and/or color information about the object itself, possibly from multiple different vantage points (poses) with respect to the object. Collecting these views of the object can provide the data for performing a comprehensive inspection of the underlying objects. This procedure of capturing views of an object is sometimes referred to as three-dimensional scanning or three-dimensional modeling and can be effectively accomplished using a 3-D modeling system, which can include one or more 3-D scanners, each of which may include one or more depth cameras.

A three-dimensional scanner is a system that is able to acquire a 3-D model of a scene from visual information in the form of one or more streams of images. In one embodiment, a three-dimensional scanner includes one or more depth cameras, where a depth camera may include one or more color cameras, which acquire the color information about an object, and one or more Infra-Red (IR) cameras which may be used in conjunction with an IR structured-light illuminator to capture geometry information about the object. The special case in which there are two IR cameras and an IR structured-light illuminator is called active stereo, and allows for simultaneous scanning from multiple depth cameras with overlapping fields-of-view. The color and the infrared cameras are synchronized and geometrically calibrated, allowing these cameras to capture sequences of frames that are constituted by color images and depth-maps, for which it is possible to provide geometrical alignment. One example of a depth camera including two IR cameras, an IR structured light illuminator, and one color camera is described in U.S. Pat. No. 9,674,504, "DEPTH PERCEPTIVE TRINOCULAR CAMERA SYSTEM," issued by the United States Patent and Trademark Office on Jun. 6, 2017, the entire disclosure of which is incorporated by reference herein.

In some embodiments of the present invention, the range cameras 100, also known as "depth cameras," include at least two standard two-dimensional cameras that have overlapping fields of view. In more detail, these two-dimensional (2-D) cameras may each include a digital image sensor such as a complementary metal oxide semiconductor (CMOS) image sensor or a charge coupled device (CCD) image sensor and an optical system (e.g., one or more lenses) configured to focus light onto the image sensor. The optical axes of the optical systems of the 2-D cameras may be substantially parallel such that the two cameras image substantially the same scene, albeit from slightly different perspectives. Accordingly, due to parallax, portions of a scene that are farther from the cameras will appear in substantially the same place in the images captured by the two cameras, whereas portions of a scene that are closer to the cameras will appear in different positions.

Using a geometrically calibrated depth camera, it is possible to identify the 3-D locations of all visible points on the surface of the object with respect to a reference coordinate system (e.g., a coordinate system having its origin at the depth camera). Thus, a range image or depth image captured by a range camera 100 can be represented as a "cloud" of 3-D points, which can be used to describe the portion of the surface of the object (as well as other surfaces within the field of view of the depth camera).

Figure 2:
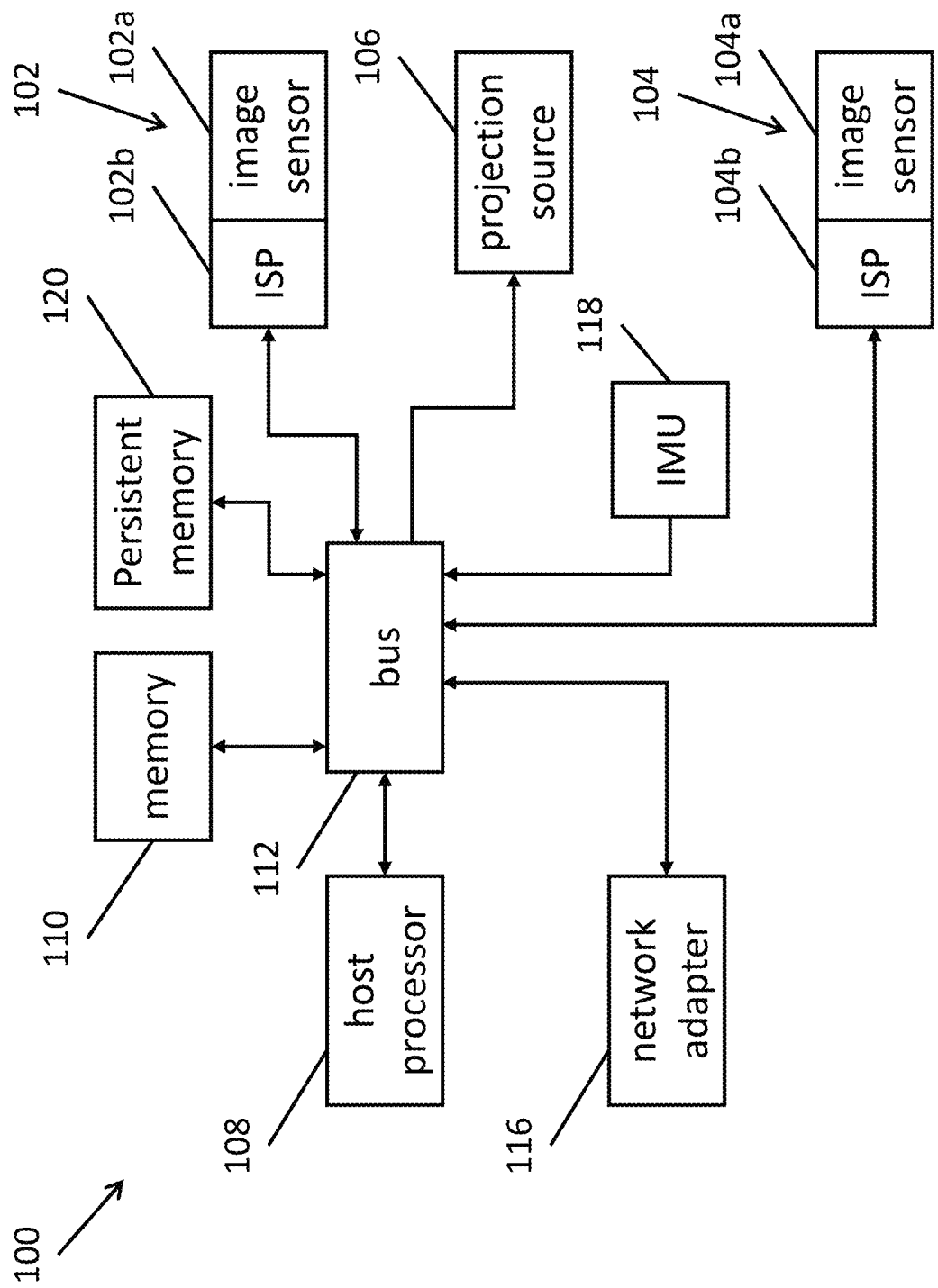
FIG. 2 is a block diagram of a depth camera system according to one embodiment of the present invention.

FIG. 2 is a block diagram of a stereo depth camera system according to one embodiment of the present invention. The depth camera system 100 shown in FIG. 2 includes a first camera 102, a second camera 104, a projection source 106 (or illumination source or active projection system), and a host processor 108 and memory 110, wherein the host processor may be, for example, a graphics processing unit (GPU), a more general purpose processor (CPU), an appropriately configured field programmable gate array (FPGA), or an application specific integrated circuit (ASIC). The first camera 102 and the second camera 104 may be rigidly attached, e.g., on a frame, such that their relative positions and orientations are substantially fixed. The first camera 102 and the second camera 104 may be referred to together as a "depth camera." The first camera 102 and the second camera 104 include corresponding image sensors 102a and 104a, and may also include corresponding image signal processors (ISP) 102b and 104b. The various components may communicate with one another over a system bus 112. The depth camera system 100 may include additional components such as a network adapter 116 to communicate with other devices, an inertial measurement unit (IMU) 118 such as a gyroscope to detect acceleration of the depth camera 100 (e.g., detecting the direction of gravity to determine orientation), and persistent memory 120 such as NAND flash memory for storing data collected and processed by the depth camera system 100. The IMU 118 may be of the type commonly found in many modern smartphones. The image capture system may also include other communication components, such as a universal serial bus (USB) interface controller.

Although the block diagram shown in FIG. 2 depicts a depth camera 100 as including two cameras 102 and 104 coupled to a host processor 108, memory 110, network adapter 116, IMU 118, and persistent memory 120, embodiments of the present invention are not limited thereto. For example, the three depth cameras 100 shown in FIG. 6 (described in more detail below) may each merely include cameras 102 and 104, projection source 106, and a communication component (e.g., a USB connection or a network adapter 116), and processing the two-dimensional images captured by the cameras 102 and 104 of the three depth cameras 100 may be performed by a shared processor or shared collection of processors in communication with the depth cameras 100 using their respective communication components or network adapters 116.

In some embodiments, the image sensors 102a and 104a of the cameras 102 and 104 are RGB-IR image sensors. Image sensors that are capable of detecting visible light (e.g., red-green-blue, or RGB) and invisible light (e.g., infrared or IR) information may be, for example, charged coupled device (CCD) or complementary metal oxide semiconductor (CMOS) sensors. Generally, a conventional RGB camera sensor includes pixels arranged in a "Bayer layout" or "RGBG layout," which is 50% green, 25% red, and 25% blue. Band pass filters (or "micro filters") are placed in front of individual photodiodes (e.g., between the photodiode and the optics associated with the camera) for each of the green, red, and blue wavelengths in accordance with the Bayer layout. Generally, a conventional RGB camera sensor also includes an infrared (IR) filter or IR cut-off filter (formed, e.g., as part of the lens or as a coating on the entire image sensor chip) which further blocks signals in an IR portion of electromagnetic spectrum.

An RGB-IR sensor is substantially similar to a conventional RGB sensor, but may include different color filters. For example, in an RGB-IR sensor, one of the green filters in every group of four photodiodes is replaced with an IR band-pass filter (or micro filter) to create a layout that is 25% green, 25% red, 25% blue, and 25% infrared, where the infrared pixels are intermingled among the visible light pixels. In addition, the IR cut-off filter may be omitted from the RGB-IR sensor, the IR cut-off filter may be located only over the pixels that detect red, green, and blue light, or the IR filter can be designed to pass visible light as well as light in a particular wavelength interval (e.g., 840-860 nm). An image sensor capable of capturing light in multiple portions or bands or spectral bands of the electromagnetic spectrum (e.g., red, blue, green, and infrared light) will be referred to herein as a "multi-channel" image sensor.

In some embodiments of the present invention, the image sensors 102a and 104a are conventional visible light sensors. In some embodiments of the present invention, the system includes one or more visible light cameras (e.g., RGB cameras) and, separately, one or more invisible light cameras (e.g., infrared cameras, where an IR band-pass filter is located across all over the pixels). In other embodiments of the present invention, the image sensors 102a and 104a are infrared (IR) light sensors.

In some embodiments in which the depth cameras 100 include color image sensors (e.g., RGB sensors or RGB-IR sensors), the color image data collected by the depth cameras 100 may supplement the color image data captured by the color cameras 150. In addition, in some embodiments in which the depth cameras 100 include color image sensors (e.g., RGB sensors or RGB-IR sensors), the color cameras 150 may be omitted from the system.

Generally speaking, a stereoscopic depth camera system includes at least two cameras that are spaced apart from each other and rigidly mounted to a shared structure such as a rigid frame. The cameras are oriented in substantially the same direction (e.g., the optical axes of the cameras may be substantially parallel) and have overlapping fields of view. These individual cameras can be implemented using, for example, a complementary metal oxide semiconductor (CMOS) or a charge coupled device (CCD) image sensor with an optical system (e.g., including one or more lenses) configured to direct or focus light onto the image sensor. The optical system can determine the field of view of the camera, e.g., based on whether the optical system is implements a "wide angle" lens, a "telephoto" lens, or something in between.

In the following discussion, the image acquisition system of the depth camera system may be referred to as having at least two cameras, which may be referred to as a "master" camera and one or more "slave" cameras. Generally speaking, the estimated depth or disparity maps computed from the point of view of the master camera, but any of the cameras may be used as the master camera. As used herein, terms such as master/slave, left/right, above/below, first/second, and CAM1/CAM2 are used interchangeably unless noted. In other words, any one of the cameras may be master or a slave camera, and considerations for a camera on a left side with respect to a camera on its right may also apply, by symmetry, in the other direction. In addition, while the considerations presented below may be valid for various numbers of cameras, for the sake of convenience, they will generally be described in the context of a system that includes two cameras. For example, a depth camera system may include three cameras. In such systems, two of the cameras may be invisible light (infrared) cameras and the third camera may be a visible light (e.g., a red/blue/green color camera) camera. All three cameras may be optically registered (e.g., calibrated) with respect to one another. One example of a depth camera system including three cameras is described in U.S. patent application Ser. No. 15/147,879 "Depth Perceptive Trinocular Camera System" filed in the United States Patent and Trademark Office on May 5, 2016, the entire disclosure of which is incorporated by reference herein.

To detect the depth of a feature in a scene imaged by the cameras, the depth camera system determines the pixel location of the feature in each of the images captured by the cameras. The distance between the features in the two images is referred to as the disparity, which is inversely related to the distance or depth of the object. (This is the effect when comparing how much an object "shifts" when viewing the object with one eye at a time—the size of the shift depends on how far the object is from the viewer's eyes, where closer objects make a larger shift and farther objects make a smaller shift and objects in the distance may have little to no detectable shift.) Techniques for computing depth using disparity are described, for example, in R. Szeliski. "Computer Vision: Algorithms and Applications", Springer, 2010 pp. 467 et seq.

The magnitude of the disparity between the master and slave cameras depends on physical characteristics of the depth camera system, such as the pixel resolution of cameras, distance between the cameras and the fields of view of the cameras. Therefore, to generate accurate depth measurements, the depth camera system (or depth perceptive depth camera system) is calibrated based on these physical characteristics.

In some depth camera systems, the cameras may be arranged such that horizontal rows of the pixels of the image sensors of the cameras are substantially parallel. Image rectification techniques can be used to accommodate distortions to the images due to the shapes of the lenses of the cameras and variations of the orientations of the cameras.

In more detail, camera calibration information can provide information to rectify input images so that epipolar lines of the equivalent camera system are aligned with the scanlines of the rectified image. In such a case, a 3-D point in the scene projects onto the same scanline index in the master and in the slave image. Let $u_m$ and $u_s$ be the coordinates on the scanline of the image of the same 3-D point p in the master and slave equivalent cameras, respectively, where in each camera these coordinates refer to an axis system centered at the principal point (the intersection of the optical axis with the focal plane) and with horizontal axis parallel to the scanlines of the rectified image. The difference $u_s - u_m$ is called disparity and denoted by d; it is inversely proportional to the orthogonal distance of the 3-D point with respect to the rectified cameras (that is, the length of the orthogonal projection of the point onto the optical axis of either camera).

Stereoscopic algorithms exploit this property of the disparity. These algorithms achieve 3-D reconstruction by matching points (or features) detected in the left and right views, which is equivalent to estimating disparities. Block matching (BM) is a commonly used stereoscopic algorithm. Given a pixel in the master camera image, the algorithm computes the costs to match this pixel to any other pixel in the slave camera image. This cost function is defined as the dissimilarity between the image content within a small window surrounding the pixel in the master image and the pixel in the slave image. The optimal disparity at point is finally estimated as the argument of the minimum matching cost. This procedure is commonly addressed as Winner-Takes-All (WTA). These techniques are described in more detail, for example, in R. Szeliski. "Computer Vision: Algorithms and Applications", Springer, 2010. Since stereo algorithms like BM rely on appearance similarity, disparity computation becomes challenging if more than one pixel in the slave image have the same local appearance, as all of these pixels may be similar to the same pixel in the master image, resulting in ambiguous disparity estimation. A typical situation in which this may occur is when visualizing a scene with constant brightness, such as a flat wall.

Methods exist that provide additional illumination by projecting a pattern that is designed to improve or optimize the performance of block matching algorithm that can capture small 3-D details such as the one described in U.S. Pat. No. 9,392,262 "System and Method for 3-D Reconstruction Using Multiple Multi-Channel Cameras," issued on Jul. 12, 2016, the entire disclosure of which is incorporated herein by reference. Another approach projects a pattern that is purely used to provide a texture to the scene and particularly improve the depth estimation of texture-less regions by disambiguating portions of the scene that would otherwise appear the same.

The projection source 106 according to embodiments of the present invention may be configured to emit visible light (e.g., light within the spectrum visible to humans and/or other animals) or invisible light (e.g., infrared light) toward the scene imaged by the cameras 102 and 104. In other words, the projection source may have an optical axis substantially parallel to the optical axes of the cameras 102 and 104 and may be configured to emit light in the direction of the fields of view of the cameras 102 and 104. In some embodiments, the projection source 106 may include multiple separate illuminators, each having an optical axis spaced apart from the optical axis (or axes) of the other illuminator (or illuminators), and spaced apart from the optical axes of the cameras 102 and 104.

An invisible light projection source may be better suited to for situations where the subjects are people (such as in a videoconferencing system) because invisible light would not interfere with the subject's ability to see, whereas a visible light projection source may shine uncomfortably into the subject's eyes or may undesirably affect the experience by adding patterns to the scene. Examples of systems that include invisible light projection sources are described, for example, in U.S. patent application Ser. No. 14/788,078 "Systems and Methods for Multi-Channel Imaging Based on Multiple Exposure Settings," filed in the United States Patent and Trademark Office on Jun. 30, 2015, the entire disclosure of which is herein incorporated by reference.

Active projection sources can also be classified as projecting static patterns, e.g., patterns that do not change over time, and dynamic patterns, e.g., patterns that do change over time. In both cases, one aspect of the pattern is the illumination level of the projected pattern. This may be relevant because it can influence the depth dynamic range of the depth camera system. For example, if the optical illumination is at a high level, then depth measurements can be made of distant objects (e.g., to overcome the diminishing of the optical illumination over the distance to the object, by a factor proportional to the inverse square of the distance) and under bright ambient light conditions. However, a high optical illumination level may cause saturation of parts of the scene that are close-up. On the other hand, a low optical illumination level can allow the measurement of close objects, but not distant objects.

Although embodiments of the present invention are described herein with respect to stereo depth camera systems, embodiments of the present invention are not limited thereto and may also be used with other depth camera systems such as structured light cameras, time of flight cameras and LIDAR cameras.

Depending on the choice of camera, different techniques may be used to generate the 3-D model. For example, Dense Tracking and Mapping in Real Time (DTAM) uses color cues for scanning and Simultaneous Localization and Mapping (SLAM) uses depth data (or a combination of depth and color data) to generate the 3-D model.

Figure 3:
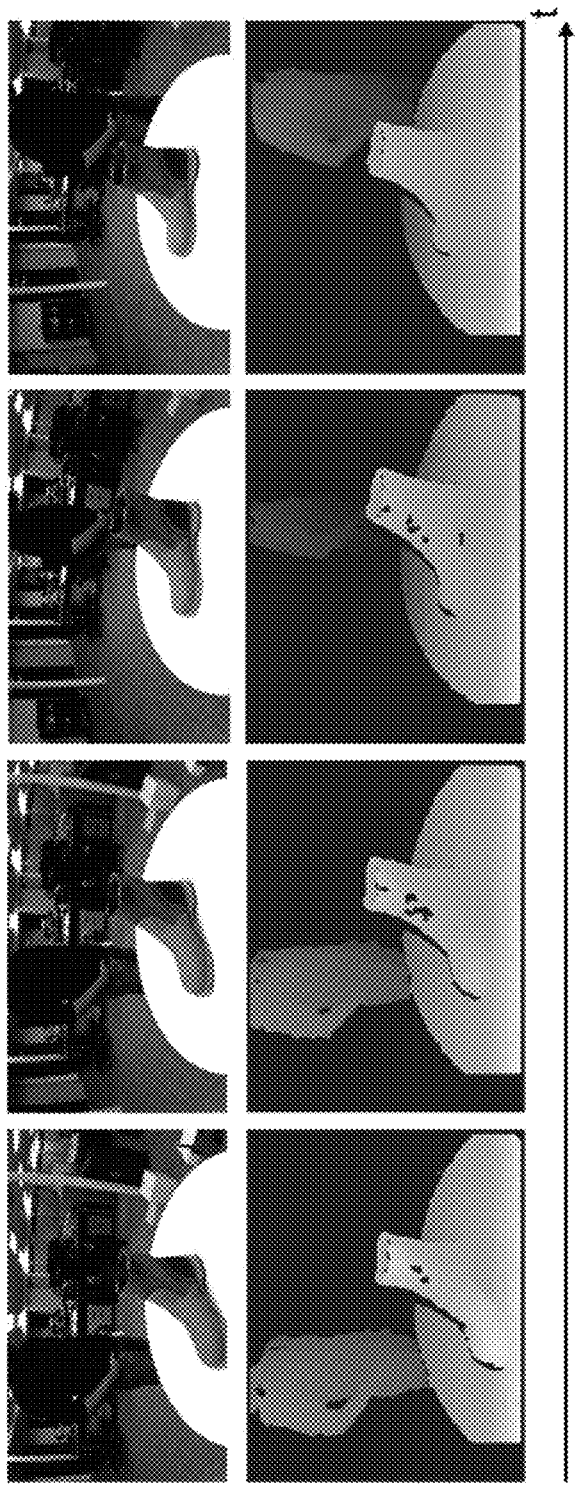
FIG. 3 is an example of a sequence of frames including depth maps and color images acquired by a depth camera that includes active stereo and at least one color camera.

FIG. 3 is an example of a sequence of frames including depth maps and color images acquired by a depth camera that includes active stereo and at least one color camera. As shown in FIG. 3, the upper row shows four color images of a boot on a table, while the lower row shows the depth maps corresponding to (e.g., captured contemporaneously or concurrently or substantially simultaneously with) the color images. As shown in the bottom row, portions of the scene that are closer to the depth camera are shown in yellow and portions of the scene that are farther away are shown in blue. Accordingly, the boot and the table are shown generally in yellow, while the background, including a person standing in the background, are shown in shades of blue. The object of interest can be separated from the background by removing pixels that have a depth greater than a threshold (e.g., removing the blue pixels in the images shown in the bottom row of FIG. 3) and by also removing the planar surface at the bottom of the remaining model.

The depth images captured at the various angles (e.g., the different columns of FIG. 3) can be combined to generate a 3-D model of the object through techniques such as iterative closest point (ICP) and structure from motion (SfM). The 3-D models may be represented as a point cloud (e.g., a collection of three-dimensional points having x, y, and z coordinates) and/or as a mesh (e.g., a collection of triangles).

Figure 4B:
FIG. 4B is a 2-D view of an example of a 3-D mesh model captured using one or more depth cameras.
Figure 4A:
FIG. 4A is a 2-D view of an example of a 3-D point cloud model.

FIG. 4A is a 2-D view of an example of a 3-D point cloud model, and FIG. 4B is a 2-D view of an example of a 3-D mesh model captured using one or more depth cameras. Examples of systems and methods for scanning are described in, for example, U.S. patent application Ser. No. 15/382,210, "3D SCANNING APPARATUS INCLUDING SCANNING SENSOR DETACHABLE FROM SCREEN," filed in the United States Patent and Trademark Office on Dec. 16, 2016; U.S. patent application Ser. No. 15/445,735, "ASSISTED SCANNING," filed in the United States Patent and Trademark Office on Feb. 28, 2017; and U.S. patent application Ser. No. 15/630,715, "SYSTEM AND METHODS FOR A COMPLETE 3D OBJECT SCAN," filed in the United States Patent and Trademark Office on Jun. 22, 2017; the entire disclosures of which are incorporated by reference herein.

To capture a full 3-D model of an object (e.g., of substantially all non-occluded surfaces of the object), it is necessary to acquire frames from an ensemble of different vantage points, such that all the locations on the surface of the object being scanned are framed from at least one of such frames. In some circumstances, it may be impractical to capture images of the bottom surface of the object (e.g., the surface of the object resting on a support such as a conveyor belt) and therefore, without limitation thereto, the term "full 3-D model" will be assumed to include circumstances where the bottom surface of the object is not captured. Capturing such information from an ensemble of viewpoints is generally a bottleneck of 3-D modeling systems, especially in the case of objects moving on a conveyor belt on a manufacturing line. Gathering such a large amount of data from a single scanner it would generally require a relatively long amount of time and the exploitation of moving components that are able to move the scanner to account for the motion of the conveyor belt. Accordingly, some embodiments of the present invention relate to aggregating data coming from multiple depth cameras (or multiple 3-D scanners), as shown in FIGS. 5A, 5B, and 6.

FIG. 5A is a schematic diagram of a scanning system 99 configured to scan objects on a conveyor belt according to one embodiment of the present invention. FIG. 5B is a schematic diagram of a scanning system according to one embodiment of the present invention configured to scan stationary objects (e.g., on a table).

Figure 6:
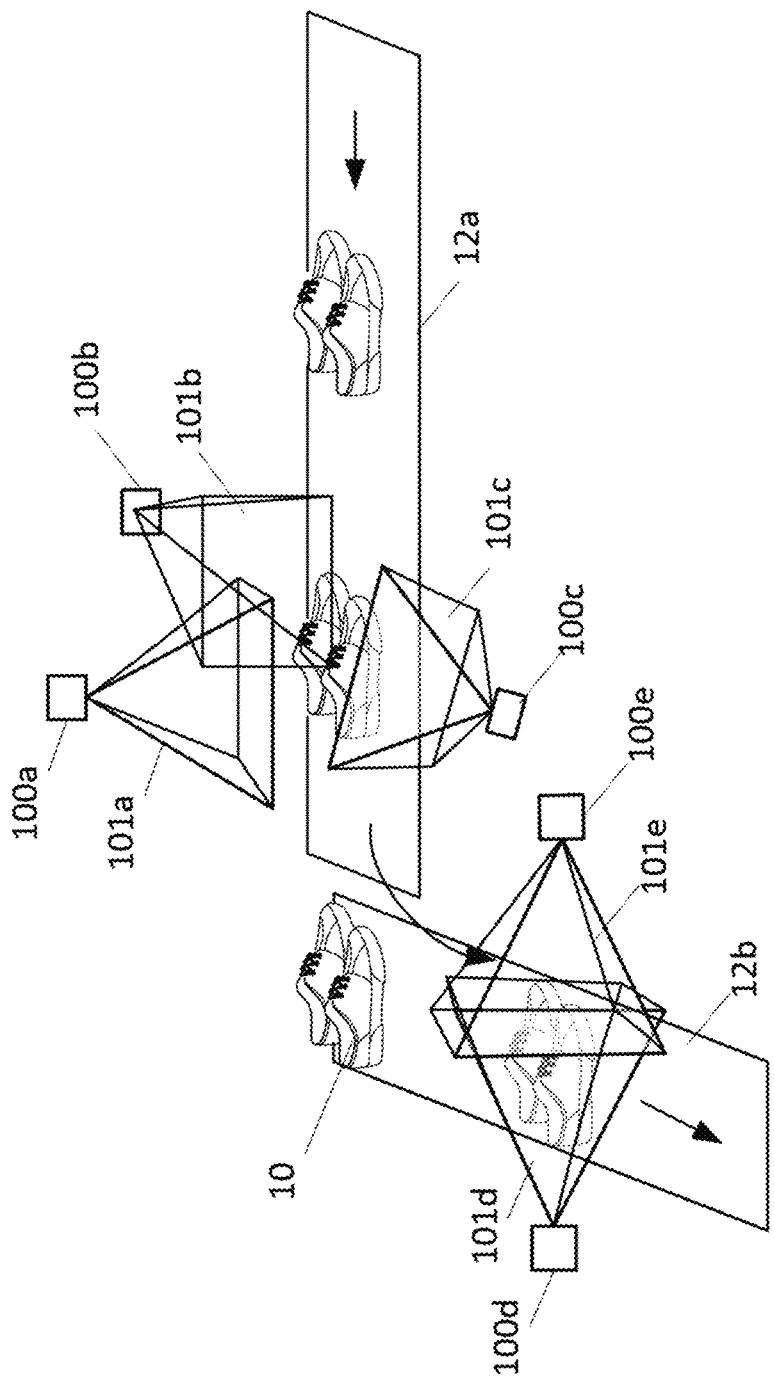
FIG. 6 is a schematic depiction of an object (depicted as a pair of shoes) traveling on a conveyor belt having two portions, where the first portion moves the object along a first direction and the second portion moves the object along a second direction that is orthogonal to the first direction in accordance with one embodiment of the present invention.

As shown in FIGS. 5A, 5B, and 6, a scanning system 99 may include multiple depth cameras 100. Each of the depth cameras 100 is calibrated at manufacturing, obtaining an estimate of the intrinsic parameters of its (2-D) camera sensors and an estimate of the intra-scanner extrinsic parameters (e.g. the rotation and translation between all the sensors, such as image sensors 102a and 104a of FIG. 2, of a single depth camera 100). An overview of standard multi-camera calibration procedures can be found in Zanuttigh, P., et al., Time-of-Flight and Structured Light Depth Cameras. 2016, Springer.

As one example of an arrangement of cameras, FIG. 6 is a schematic depiction of an object 10 (depicted as a pair of shoes) traveling on a conveyor belt 12 having two portions, where the first portion moves the object 10 along a first direction and the second portion moves the object 10 along a second direction that is orthogonal to the first direction in accordance with one embodiment of the present invention. When the object 10 travels along the first portion 12a of the conveyor belt 12, a first camera 100a images the top surface of the object 10 from above, while second and third cameras 100b and 100c image the sides of the object 10. In this arrangement, it may be difficult to image the ends of the object 10 because doing so would require placing the cameras along the direction of movement of the conveyor belt and therefore may obstruct the movement of the objects 10. As such, the object 10 may transition to the second portion 12b of the conveyor belt 12, where, after the transition, the end of the object 10 are now visible to cameras 100d and 100e located on the sides of the second portion 12b of the conveyor belt 12. As such, FIG. 6 illustrates an example of an arrangement of cameras that allows coverage of the entire visible surface of the object 10.

In some embodiments, the extrinsic parameters of the depth cameras 100 (e.g., relative poses) are estimated through another calibration step, in which a calibration target (e.g., an object of known size with identifiable and precisely detectable features, such as a black-and-white 2-D checkerboard) is acquired by all the depth cameras, in order to detect the relative rotation and translation between each of the scanner composing the 3-D modeling system. Accordingly, the extrinsic parameters can be used to compute or to estimate the transformations that may be applied to the separate depth maps (e.g., 3-D point clouds) captured by the different depth cameras in order to merge the depth maps to generate the captured 3-D model of the object.

Examples of systems and methods for three-dimensional scanning are described in more detail in U.S. patent application Ser. No. 15/866,217, "SYSTEMS AND METHODS FOR DEFECT DETECTION," filed in the United States Patent and Trademark Office on Jan. 9, 2018 and U.S. patent application Ser. No. 15/974,595, "SYSTEMS AND METHODS FOR INSPECTION AND DEFECT DETECTION USING 3-D SCANNING," filed in the United States Patent and Trademark Office on May 8, 2018, the entire disclosures of which are incorporated by reference herein.

Generation of 3-D Models

If depth images are captured by the depth cameras 100 at different poses (e.g., different locations with respect to the target object 10), then it is possible to acquire data regarding the shape of a larger portion of the surface of the target object 10 than could be acquired by a single depth camera through a point cloud merging module 210 (see FIG. 7) of a 3-D model generation module 200 that merges the separate depth images (represented as point clouds) 14 into a merged point cloud 220. For example, opposite surfaces of an object (e.g., the medial and lateral sides of the boot shown in FIG. 7) can both be acquired, whereas a single camera at a single pose could only acquire a depth image of one side of the target object at a time. The multiple depth images can be captured by moving a single depth camera over multiple different poses or by using multiple depth cameras located at different positions. Merging the depth images (or point clouds) requires additional computation and can be achieved using techniques such as an Iterative Closest Point (ICP) technique (see, e.g., Besl, Paul J., and Neil D. McKay. "Method for registration of 3-D shapes." Robotics-DL tentative. International Society for Optics and Photonics, 1992.), which can automatically compute the relative poses of the depth cameras by optimizing (e.g., minimizing) a particular alignment metric. The ICP process can be accelerated by providing approximate initial relative poses of the cameras, which may be available if the cameras are "registered" (e.g., if the poses of the cameras are already known and substantially fixed in that their poses do not change between a calibration step and runtime operation). Systems and methods for capturing substantially all visible surfaces of an object are described, for example, in U.S. patent application Ser. No. 15/866,217, "Systems and Methods for Defect Detection," filed in the United States Patent and Trademark Office on Jan. 9, 2018, the entire disclosure of which is incorporated by reference herein.

A point cloud, which may be obtained by merging multiple aligned individual point clouds (individual depth images) can be processed to remove "outlier" points due to erroneous measurements (e.g., measurement noise) or to remove structures that are not of interest, such as surfaces corresponding to background objects (e.g., by removing points having a depth greater than a particular threshold depth) and the surface (or "ground plane") that the object is resting upon (e.g., by detecting a bottommost plane of points).

In some embodiments, the system further includes a plurality of color cameras 150 configured to capture texture (color) data 16 of the query object. As noted above, in some embodiments of the present invention, the depth cameras may use RBG-IR sensors which capture both infrared data and color camera data, such that the depth cameras 100 provide color data 166 instead of using separate color cameras 150. The texture data may include the color, shading, and patterns on the surface of the object that are not present or evident in the physical shape of the object. In some circumstances, the materials of the target object may be reflective (e.g., glossy). As a result, texture information may be lost due to the presence of glare and the captured color information may include artifacts, such as the reflection of light sources within the scene. As such, some aspects of embodiments of the present invention are directed to the removal of glare in order to capture the actual color data of the surfaces. In some embodiments, this is achieved by imaging the same portion (or "patch") of the surface of the target object from multiple poses, where the glare may only be visible from a small fraction of those poses. As a result, the actual color of the patch can be determined by computing a color vector associated with the patch for each of the color cameras, and computing a color vector having minimum magnitude from among the color vectors. This technique is described in more detail in U.S. patent application Ser. No. 15/679,075, "System and Method for Three-Dimensional Scanning and for Capturing a Bidirectional Reflectance Distribution Function," filed in the United States Patent and Trademark Office on Aug. 15, 2017, the entire disclosure of which is incorporated by reference herein.

Figure 7:
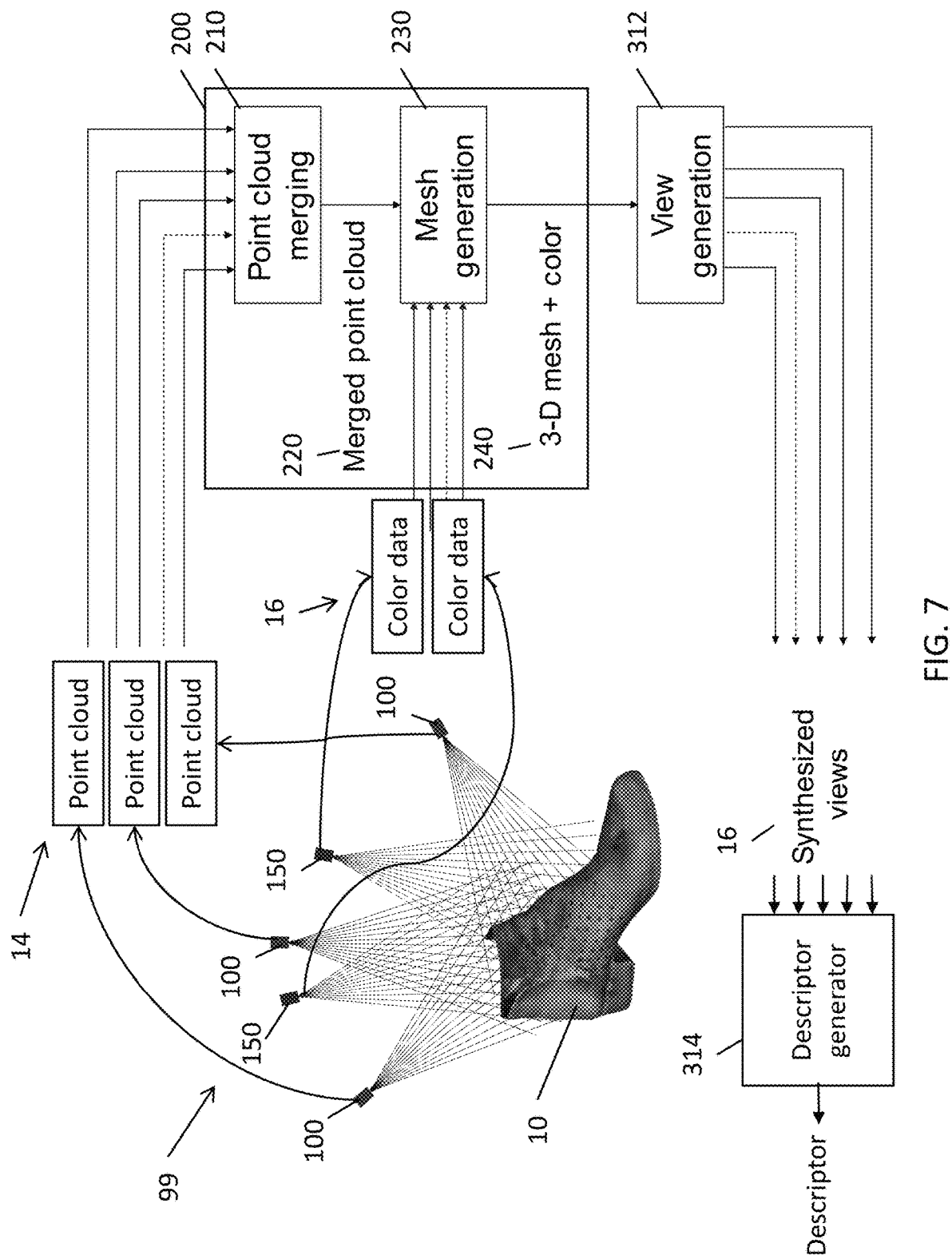
FIG. 7 is a schematic block diagram illustrating a process for capturing images of a target object and generating a descriptor for the target object according to one embodiment of the present invention.

In some embodiments, the point clouds are combined to generate a 3-D model. FIG. 7 is a schematic block diagram illustrating a process for capturing images of a target object and generating a descriptor for the target object according to one embodiment of the present invention. For example, the separate point clouds 14 are merged by a point cloud merging module 210 to generate a merged point cloud 220 (e.g., by using ICP to align and merge the point clouds and also by removing extraneous or spurious points to reduce noise and to manage the size of the point cloud 3-D model). In some embodiments, a mesh generation module 230 computes a 3-D mesh 240 from the merged point cloud using techniques such as Delaunay triangulation and alpha shapes and software tools such as MeshLab (see, e.g., P. Cignoni, M. Callieri, M. Corsini, M. Dellepiane, F. Ganovelli, G. Ranzuglia MeshLab: an Open-Source Mesh Processing Tool Sixth Eurographics Italian Chapter Conference, pages 129-136, 2008.). The 3-D model (whether a 3-D point cloud model 220 or a 3-D mesh model 240) can be combined with color information 16 from the color cameras 150 about the color of the surface of the object at various points, and this color information may be applied to the 3-D point cloud or 3-D mesh model as a texture map (e.g., information about the color of the surface of the model).

Analysis Agent

Referring back to the block diagram of FIG. 1A, in some embodiments of the present invention, the 3-D model acquired by the one or more 3-D scanners 100 can be supplied to an analysis agent or inspection system 300, which analyzes the input data (e.g., the 3-D model and, in some instances, a subset of the acquired frames) in operation 530, in order to infer or compute one or more properties about the object itself. Examples of properties of an object include, for example, whether the object is fragile, whether it appears to contain hazardous substances, and the like.

Generally, a complex inspection task can be expressed in the form of a decision tree, in which the decisions are either binary or K-ary. This statement is motivated by the fact that, in general, a simple inspection task produces an output that is either a binary number (e.g., zero or one or a binary classifier), a decision among K different classes (e.g., an integer in a set of integers of size K or a K-ary classifier), or a real number (e.g., a real or floating-point value in the interval [0, 1]). In the first case, the simple inspection task is said to be a binary classification task or a detection task, in the second case the simple inspection task is said to be a classification task with K classes, and in the third case the simple inspection task is said to be a regression task, where the term "regression" is used herein informally as a general name for mathematical modeling tasks whose output is a real number. Other examples of such "regression" tasks include parametric function mapping, functional mapping and fuzzy logic.

Figure 8:
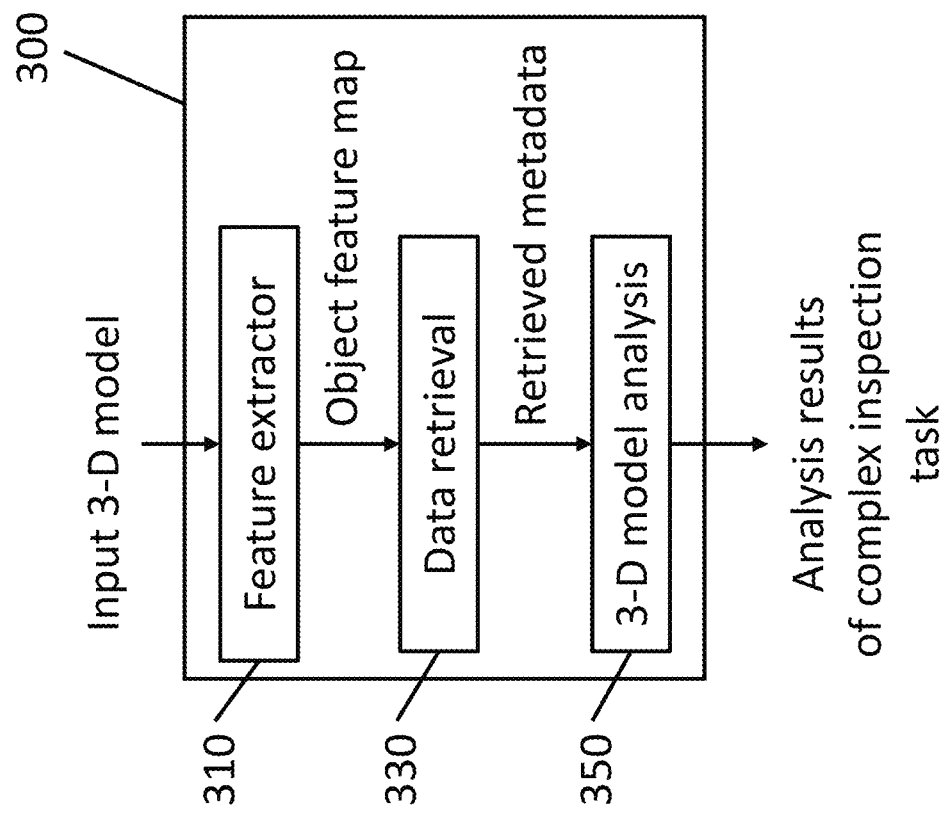
FIG. 8 is a block diagram of an analysis system according to one embodiment of the present invention.
Figure 9:
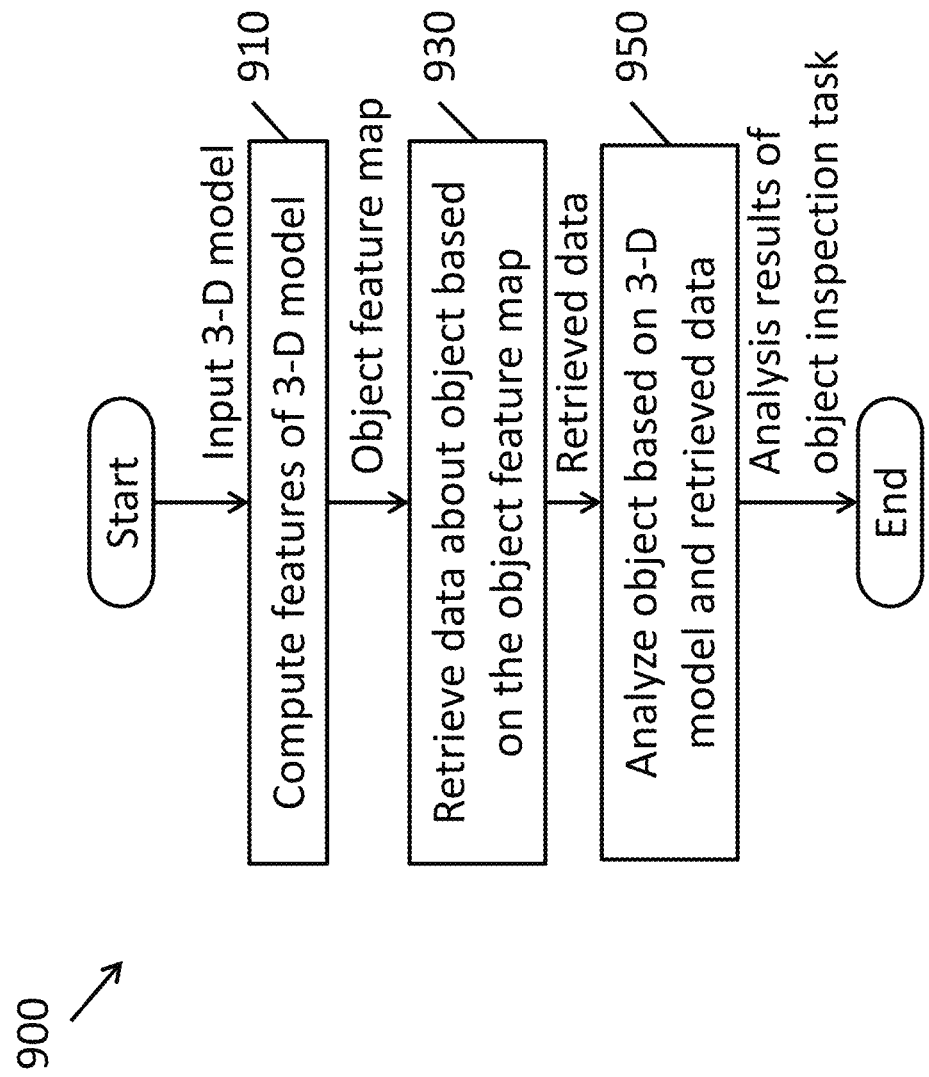
FIG. 9 is a flowchart of a method for performing an inspection task by analyzing a 3-D model of an object using an analysis system according to one embodiment of the present invention.

FIG. 8 is a block diagram of an analysis system according to one embodiment of the present invention. FIG. 9 is a flowchart of a method for performing an inspection task by analyzing a 3-D model of an object using an analysis system according to one embodiment of the present invention. The analysis system 300 may be implemented using a computer system, which may include a processor and memory, where the memory stores instructions that cause the processor to execute various portions of methods according to embodiments of the present invention.

Various computational portions of embodiments of the present invention may be implemented through purpose-specific computer instructions executed by a computer system. The computer system may include one or more processors, including one or more central processing units (CPUs), one or more graphics processing units (GPUs), one or more field programmable gate arrays (FPGAs), one or more digital signal processors (DSPs), and/or one or more application specific integrated circuits (ASICs) such as neuromorphic processors and other processing units configured to implement neural networks such as "tensor processing units" (TPUs), vector processors, and the like. The computer system may also include peripherals such as communications devices (e.g., network adapters, serial or parallel data bus adapters, graphics adapters) for transmitting and/or receiving data to and from other devices such as 3-D scanning systems, data storage systems (e.g., databases), display devices, and other computer systems. The computations may be distributed across multiple separate computer systems, some of which may be local to the scanning of the query objects (e.g., on-site and connected directly to the depth and color cameras, or connected to the depth and color cameras over a local area network), and some of which may be remote (e.g., off-site, "cloud" based computing resources connected to the depth and color cameras through a wide area network such as the Internet).

In some embodiments of the present invention, the processing is performed at the camera (e.g., in one or more processors and memory of the scanners 100), and object analysis results (e.g., object classifications) may be computed by the scanners 100. In some embodiments of the present invention, the individual outputs of the different scanners (e.g., the different visual information) may be combined together and analyzed together to compute an overall object classification. In some embodiments of the present invention, a group of cameras may share one or more local processors to compute analysis results based on the images captured by the different scanners 100 of the group. In some embodiments of the present invention, by performing the data analysis locally, the amount of data transferred over a network is reduced (e.g., transmitting analysis results is generally less bandwidth intensive than transmitting depth maps or 3-D models), thereby allowing for a greater number of cameras to be distributed throughout an environment without requiring a large investment in networking equipment to provide sufficient bandwidth. Some considerations and systems for distributing a computation between a local processing device and a remote (or "offline") processing device are described, for example, in U.S. patent application Ser. No. 15/805,107 "SYSTEM AND METHOD FOR PORTABLE ACTIVE 3D SCANNING," filed in the United States Patent and Trademark Office on Nov. 6, 2017, the entire disclosure of which is incorporated by reference herein.

For the sake of convenience, the computer systems configured using particular computer instructions to perform purpose specific operations for inspecting target objects based on captured images of the target objects are referred to herein as parts of inspection agents or inspection systems.

As shown in FIG. 8, the analysis system 300 may include a feature extractor 310, a data retrieval module 330 and a 3-D model analysis module 350. In operation 910, the feature extractor 310 generates an object feature map from an input 3-D module, and the data retrieval module 330 retrieves, in operation 930, metadata (e.g., from a database) corresponding to the object based on the object feature map. The 3-D model analysis module 350 uses the retrieved data to analyze the input 3-D model (e.g., analyze the object feature map) in operation 950 and to generate analysis results.

Figure 10:
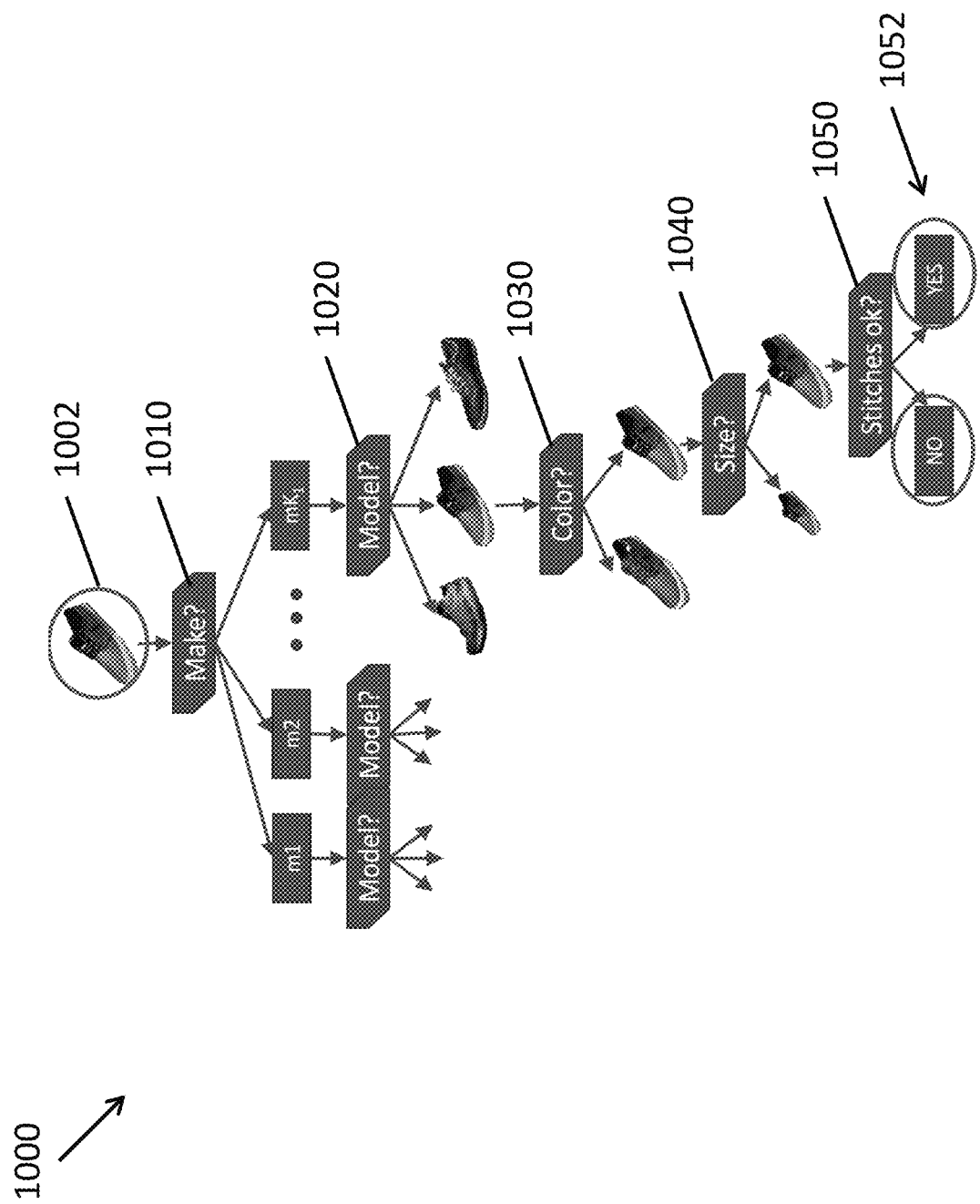
FIG. 10 is a depiction of an example decision tree of the complex inspection task of inspecting the stitching of a shoe.

FIG. 10 is a depiction of an example decision tree 1000 of the complex inspection task of inspecting the stitching of a shoe. According to various embodiments of the present invention, the analysis system 300 may implement a decision tree such as the example decision tree 1000 shown in FIG. 10 as a part of a process for performing a complex inspection task on an object. In some embodiments of the present disclosure, the analysis system implements a decision tree similar to that shown in FIG. 10 instead of some or all of the explicit separate modules and stages shown in FIG. 8 and instead of some or all of the operations shown in the flowchart of FIG. 9.

As shown in FIG. 10, for a given input 1002 (e.g., visual information of a particular shoe under inspection), a first task 1010 of the example decision tree 1000 relates to identifying a make of the shoe (e.g., a K-ary classifier between K different makes). Each of the makes may be associated with various models produced by the corresponding manufacturer. Accordingly, a second task 1020 relates to identifying the particular model (e.g., another K-ary classifier), and a third task 1030 relates to identifying the color of the shoe (e.g., another K-ary classifier), followed by identifying the size of the shoe in a fourth task 1040 (e.g., another K-ary classifier or a regression task with discretization to valid shoe sizes). At a fifth task 1050, the information from the previous steps is used to determine whether the stitches are acceptable, based on information loaded (e.g., from a database) about characteristics of acceptable stitching on a shoe, as described in more detail below.

As shown in FIG. 10, the final output 1052 of the complex inspection task is a joint function of all the simple inspection tasks 1010, 1020, 1030, 1040, and 1050 that constitute the complex task 1000 itself, therefore it is desirable to perform a joint learning of all such simple tasks 1010, 1020, 1030, 1040, and 1050 with the goal of obtain an optimal solution for the complex task 1000, without falling into the risk of sub-optimal configurations that can be obtained by simply optimizing single tasks 1010, 1020, 1030, 1040, and 1050.

Without loss of generality and for the sake of convenience, the below discussion will focus the analysis on the case in which each simple task is a binary classifier, and in which the output of the complex task is also a binary decision. However, embodiments of the present disclosure are not limited thereto. (For example, a K-ary classifier can be always represented as a combination of K binary classifiers.) The output of a binary classifier can be either POSITIVE (the feature under inspection is present) or NEGATIVE (the feature under inspection is not present). (Unfortunately, this terminology is somehow misleading in the case defect inspection tasks, for which the feature under inspection is actually the presence of a defect. Therefore, in this case, a positive outcome is a signal of the presence of a defect and a negative outcome is a signal of the absence of a defect.)

The training of a binary classifier is usually performed in a supervised fashion, i.e., a set of data (training set), for which the ground truth value of the outcome of the test is available (e.g., labels manually generated by human inspectors), is used to train the classifier in order to learn how to perform an inference or prediction. A disjoint set of labeled data (called a test set) containing data for which the ground truth value of the outcome of the test is available, is used to characterize the performance of the trained classifier.

A sample in the test data is said to be: a True Positive (TP), if both the ground truth value and the estimate of the classifier agree that the feature is present; a True Negative (TN), if both the ground truth value and the estimate of the classifier agree that the feature is absent; a False Positive (FP), if the classifier estimates that the feature is present, but the feature is actually absent; or a False Negative (FN), if the classifier estimates that the feature is absent, but the feature is actually present.

The following quantities can therefore be defined: True Positive rate (TPr) is the ratio between the number of TPs and the number of Positives in the test set; and False Positive rate (FPr) is the ratio between the number of FPs and the number of Negatives in the test set. An ideal classifier is characterized by a TPr=1 and FPr=0.

The performance of binary classifiers can be effectively analyzed by means of the Receiver Operating Characteristic (ROC) curve (see, e.g., Schlegl, T., Seeböck, P., Waldstein, S. M., Schmidt-Erfurth, U., & Langs, G. (2017, June). Unsupervised anomaly detection with generative adversarial networks to guide marker discovery. In *International Conference on Information Processing in Medical Imaging* (pp. 146-157). Springer, Cham.). The x-axis of a ROC curve corresponds to the FPr and the y-axis corresponds to the TPr. The Area Under the Curve (AUC) of a ROC curve can be used as indicator of the quality of a classifier: the closer the AUC is to 1, the higher is the quality of the classifier.

While a binary classifier is generally characterized by a TPr and a FPr value (hence the ROC curve is constituted by joining (0,0), such (FPr, TPr) point, and (1,1)), there is a family of classifiers for which it is possible to obtain different (TPr, FPr) pairs by varying a parameter of the classifier (e.g., varying the threshold on the output of a regressor) to obtain a curve like that described above for the ROC.

Neural Network Based Simple Classifiers

Neural networks make up one family of simple classifiers. Neural network architectures are well suited for being trained as binary classifiers. In this case, for a given input sample, a neural network is trained to compute a score for each of the two classes ($x_0$, $x_1$) and then the last layer of the neural network estimates a binary output by selecting the class with largest score. This operation can be modified in order to obtain different values of (TPr, FPr) pairs. In particular, instead of picking the largest value between $x_0$ and $x_1$, it is possible to normalize the scores, obtaining the normalized scores $y_0$, $y_1$. One approach is to perform a mapping such that outputs are non-negative and their sum of absolute values is 1, such as:

$$x_0 \to y_0 = (x_0 - \min(x_0, x_1))/(x_0^2 + x_1^2)$$

$$x_1 \to y_1 = (x_1 - \min(x_0, x_1))/(x_0^2 + x_1^2)$$

Under such an approach, only one of the two scores is considered and a threshold is applied (e.g., $x_0$>th). By selecting different values of the threshold, it is possible to obtain the different (TPr, FPr) pairs that form the ROC curve.

Notable subfamilies of Neural Networks that benefit the same properties are Deep Neural Networks (DNNs) (see, e.g., Goodfellow, I., Bengio, Y., Courville, A., & Bengio, Y. (2016). *Deep learning* (Vol. 1). Cambridge: MIT Press.), Convolutional Neural Networks for image classifications (CNNs) (see, e.g., Simonyan, K., & Zisserman, A. (2014). Very deep convolutional networks for large-scale image recognition. *arXiv preprint arXiv:*1409.1556.), Multi-View Convolutional Neural Networks for 3D model classification (MVCNNs) (see, e.g., Su, H., Maji, S., Kalogerakis, E., & Learned-Miller, E. (2015). Multi-view convolutional neural networks for 3d shape recognition. In *Proceedings of the IEEE international conference on computer vision* (pp. 945-953).) and Support Vector Machines (SVMs).

Some aspects of embodiments of the present disclosure relate to the use of transfer learning of CNNs trained for image classification. (See, e.g., Chatfield, K., Simonyan, K., Vedaldi, A., & Zisserman, A. (2014). Return of the devil in the details: Delving deep into convolutional nets. *arXiv preprint arXiv:*1405.3531.) In such circumstances, the input to the classifier may include one or more images (e.g., color images, grayscale images, and depth maps), where a CNN is applied to each of the input images, and an intermediate representation (a feature vector or feature map in feature space) is extracted from the images by evaluating a penultimate (second to last) layer of the CNN, and the feature vectors in the training set are used to train a support vector machine (SVM) (or other classifier) to perform binary classification.

One aspect shared by some types of simple classifiers is that multiple different classifiers can share the part of the CNN that is used for computing the feature vector or feature map. This sharable CNN is generally characterized by a large memory and computational footprint, because it is typically constituted by several convolutional and fully connected layers. Therefore, by sharing such computations it is possible to reduce the amount of required training samples and lower the required computational resources. Accordingly, the learning that was accomplished by training the sharable CNN is "transferred" or "transferrable" to other simple tasks. As such, as shown in FIG. 8, some aspects of embodiments of the present disclosure relate to the use of a shared feature extractor 310 (which includes, for example, a shared CNN) which extracts a object feature map that is supplied as an input to various different simple classifiers.

Examples of CNNs that may be used as part of the feature extractor 310 include MobileNetV2 (see, e.g., Sandler, Mark, et al. "MobileNetV2: Inverted residuals and linear bottlenecks." *Proceedings of the IEEE Conference on Computer Vision and Pattern Recognition.* 2018.), MobileNetV3 (see, e.g., Howard, Andrew, et al. "Searching for MobileNetV3." *arXiv preprint arXiv:*1905.02244 (2019).), MnasNet (see, e.g., Tan, Mingxing, et al. "MnasNet: Platform-aware neural architecture search for mobile." *Proceedings of the IEEE Conference on Computer Vision and Pattern Recognition.* 2019.), and Xception (see, e.g., Chollet, Francois. "Xception: Deep learning with depthwise separable convolutions." *Proceedings of the IEEE conference on computer vision and pattern recognition.* 2017.).

Additional examples of the use of neural networks to perform defect analysis, and which may be used as simple classifiers in embodiments of the present invention, are described, for example, in U.S. patent application Ser. No. 15/866,217, published on Jul. 26, 2018 as US 2018/0211373, in U.S. patent application Ser. No. 15/974,595, published on Nov. 8, 2018 as US 2018/0322623, and in U.S. patent application Ser. No. 16/158,280, published on Apr. 11, 2019 as US 2019/0108396, the entire disclosures of which are incorporated by reference herein.

Image and Depth Map Processing Based Simple Classifiers

Another example class of simple classifiers is based on processing images acquired by color cameras and depth maps acquired by depth cameras using techniques including image processing, statistics and mathematical modeling. Common techniques that can be used in this case include background/foreground segmentation (see, e.g., Kim, K., Chalidabhongse, T. H., Harwood, D., & Davis, L. (2005). Real-time foreground—background segmentation using codebook model. *Real-time imaging,* 11(3), 172-185.), clustering and grouping (see, e.g., Duda, R. O., Hart, P. E., & Stork, D. G. (2012). *Pattern classification.* John Wiley & Sons.), connected components analysis (see, e.g., Bradski, G., & Kaehler, A. (2008). *Learning OpenCV: Computer vision with the OpenCV library.* "O'Reilly Media, Inc.".), robust statistics (see. e,g., Huber, P. J. (2011). Robust statistics. In *International Encyclopedia of Statistical Science* (pp. 1248-1251). Springer, Berlin, Heidelberg.), and 3D geometrical processing.

These image processing techniques generally can be considered to output a real number between 0 and 1 (or can have their outputs normalized to the range of 0 to 1), in which values closer to 1 indicate the presence of the feature in the input and values closer to 0 indicate the absence of the feature in the input. The real valued output can then be mapped to binary values (e.g., 0 or 1) based on, for example, whether the real valued output is closer to 0 or 1 (in other embodiments, for example, a threshold between 0 and 1 is set or learned, such that values greater than the threshold are treated as 1 and values below the threshold are treated as 0). This mapping to [0, 1] typically helps for jointly training the complex classifier, as described in more detail below, but embodiments of the present invention are not limited thereto. The output value can be checked with respect to a threshold and by varying this threshold it is possible to obtain different (TPr, FPr) pairs, analogously to the case of neural-network based classifiers.

Label Based Simple Classifiers

Another example class of simple classifiers is based on the presence of a certain type of labels, including text (see, e.g., Smith, R. (2007, September). An overview of the Tesseract OCR engine. In *Document Analysis and Recognition, 2007. ICDAR 2007. Ninth International Conference on* (Vol. 2, pp. 629-633). IEEE.), icons (see, e.g., Redman, J., Divvala, S., Girshick, R., & Farhadi, A. (2016). You only look once: Unified, real-time object detection. In *Proceedings of the IEEE conference on computer vision and pattern recognition* (pp. 779-788).) and codes (e.g., barcodes, QR-codes) (see, e.g., Gallo, O., Manduchi, R., & Rafii, A. (2011). CC-RANSAC: Fitting planes in the presence of multiple surfaces in range data. Pattern Recognition Letters, 32(3), 403-410.). The output of these classifiers is generally at a higher reasoning level, given the purpose-oriented nature of the information to be acquired. Therefore, the output of these classifiers is generally in the form of a binary detection (e.g., detecting the presence of text that says "do not stack" or "non-stackable package") with some specification (e.g., the entire text is detected in the acquired image). Techniques involved in this type of classifiers include but are not limited to attention models (see, e.g., Xiao, T., Xu, Y., Yang, K., Zhang, J., Peng, Y., & Zhang, Z. (2015). The application of two-level attention models in deep convolutional neural network for fine-grained image classification. In *Proceedings of the IEEE Conference on Computer Vision and Pattern Recognition* (pp. 842-850).), text identification and recognition in images (see, e.g., Smith, R., cited above), and Long-Short-Term-Memory (LSTM) models (see, e.g., Goodfellow, I., Bengio, Y., Courville, A., & Bengio, Y. (2016). *Deep learning* (Vol. 1). Cambridge: MIT press.).

Complex Classifiers

As discussed above with respect to FIG. 10, a complex inspection task can be decomposed into simple inspection tasks. As such, a complex classifier according to aspects of embodiments of the present invention is the combination of simple classifiers such as those described above (e.g., one or more neural network-based classifiers, image and depth map processor-based classifiers, and/or label-based classifiers), where the complex classifier may compute predictions or inferences regarding the result of a complex inspection task on a particular input such as a 3D model of an object and/or a collection of 2-D images (e.g., monochrome or grayscale images, color images, and/or depth maps) of the object.

A complex classifiers benefits from decomposing the complex inspection task into simple decisions implemented by corresponding simple classifiers because the simple classifiers may be more easily trained, and because interdependencies and redundancies between the simple classifiers result in a more robust and easily trained complex classifier (e.g., an optimal complex classifier), in comparison to training a single classifier to compute the complex inspection result directly from the input, without decomposing the analysis into separate decision steps (e.g., as represented by a decision tree, such as the decision tree shown in FIG. 10).

Figure 11:
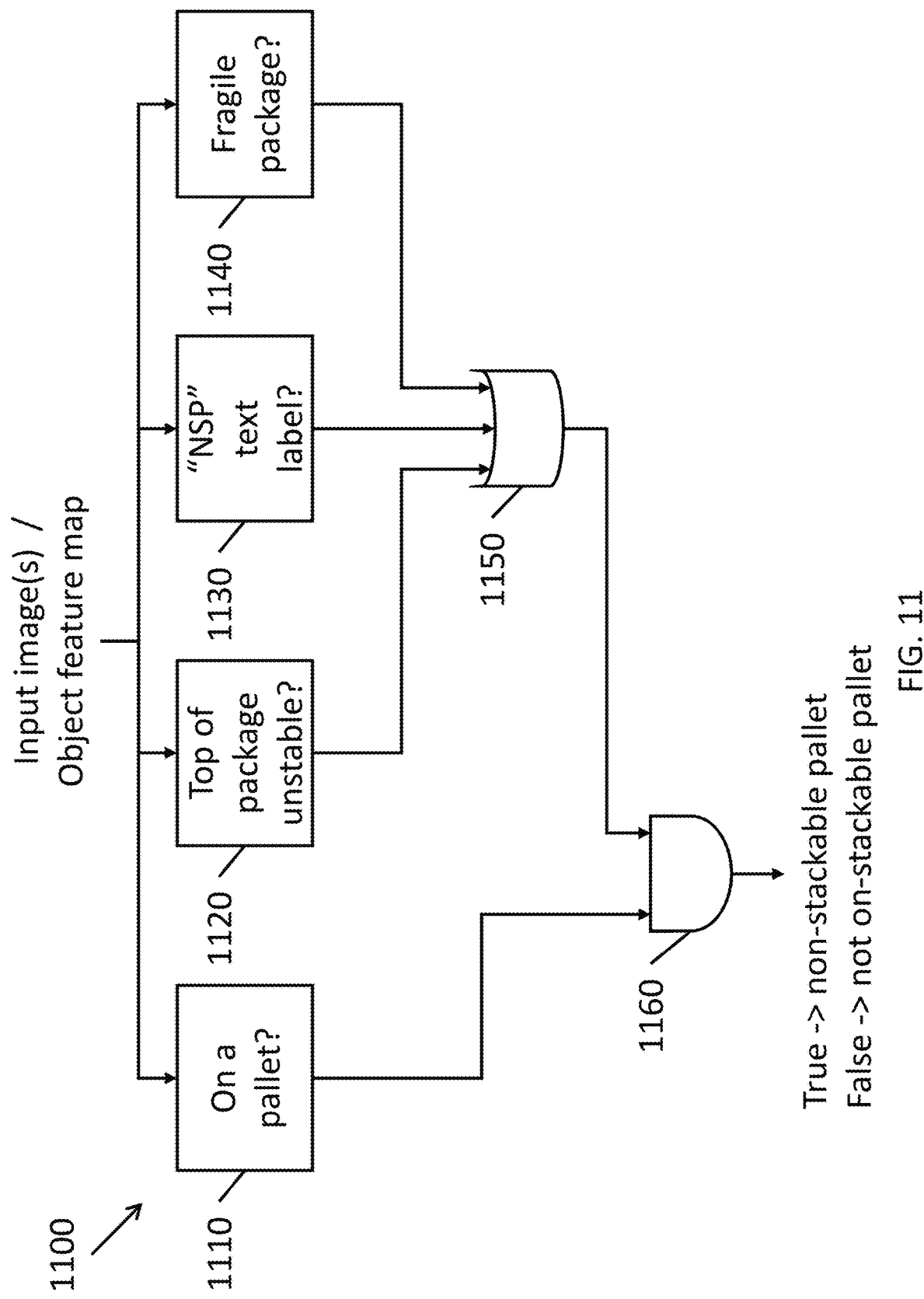
FIG. 11 is a schematic diagram of a complex classifier according to one embodiment of the present invention for determining whether a given pallet is an NSP.

As discussed above, a plurality of different simple classifiers may be combined using various logical operations such as Boolean logic, arithmetic, fuzzy logic, and the like. For example, the evaluation of whether a given pallet is a non-stackable pallet (NSP) is an example of simple classification tasks that are combined with Boolean logic. FIG. 11 is a schematic diagram of a complex classifier according to one embodiment of the present invention for determining whether a given pallet is an NSP. As discussed above, determining whether a pallet is a non-stackable pallet includes determining (1) if the package is on a pallet, and if at least one of the following conditions is met: (2) the top of the package is not stable; (3) there is a sign or label on the exterior of the package that specifies that it is NSP; or (4) the contents of the package are fragile (e.g., a television). This may be expressed as (1) AND ((2) OR (3) OR (4)).

Accordingly, as shown in FIG. 11, a complex classifier 1100 according to one embodiment of the present invention includes four simple classifiers (1110, 1120, 1130, and 1140), which generate Boolean outputs (e.g., True/False) and these Boolean values are combined using Boolean logic (1150 and 1160) to compute a determination as to whether or not the input depicts an NSP. As noted above the input may include one or more images captured by one or more cameras and/or may include a feature map computed from the one or more input images. The input images may be monochrome or grayscale, color, and/or depth images, and the feature extractor 310 (which may include a CNN) may compute the feature map based on the input images.

Continuing the above discussion, a first simple classifier 1110 is configured or trained to determine whether or not the input image is on a pallet. The first simple classifier 1110 may be trained to determine whether or not its given input (images and/or feature map) depicts packages stacked on a pallet by training a neural network in accordance with labeled training data that includes representative images (e.g., captured in a warehouse setting) of packages that are on a pallet and packages that are not on a pallet. In the case of a neural network, the training may be performed using, for example the backpropagation algorithm. Accordingly, the first simple classifier 1110 may be trained to output True when the given input depicts or corresponds to one or more packages on a pallet and to output False when the given input does not.

The second simple classifier 1120 may be trained in the substantially same way. For example, the second simple classifier 1120 may include its own neural network that is trained based on a set of training data with input feature maps computed from images depicting circumstances where top of the package is stable and circumstances where the top of the package is unstable, along with corresponding "stable" and "unstable" labels.

The third simple classifier 1130 may apply label-based classification discussed above to determine whether the package is labeled with language that indicates it is an NSP. For example, the feature map may be used to identify portions (e.g., bounding boxes) of the input image that contain text, and optical character recognition (OCR) algorithms may be applied to recognize the text depicted in corresponding portions of the color image captured by the scanning system 99. The recognized text can then be matched against various standard ways in which NSP is indicated on packages, such as the words "do not stack" and "non-stackable" and/or in other languages. The third simple classifier 1130 may then output True if such a label is detected, and False if no such label is detected.

The fourth simple classifier 1140 may also apply label-based classification to detect the presence of text or icons on the package that indicate that the contents are fragile. In addition, in some embodiments, the found simple classifier 1140 may use information previously retrieved from a database (e.g. shipping manifest and tracking database) in operation 930 to determine whether the current package is fragile. Accordingly, the fourth simple classifier 1140 may output a determination as to whether or not the current package is fragile.

As discussed above, determining whether the instant pallet is an NSP takes the form (1) AND ((2) OR (3) OR (4)). Accordingly, the Boolean OR operation 1150 computes the Boolean OR of the outputs of the second, third, and fourth simple classifiers 1120, 1130, and 1140. The output of the first simple classifier 1110 and the output of the Boolean OR operation 1150 are supplied to the AND operation 1160 to compute the final determination as to whether or not the pallet is NSP.

While FIG. 11 shows combinations of binary classifiers using Boolean operations, embodiments of the present invention are not limited thereto. For example, for example, when the outputs of the simple classifiers are K-ary, the particular output may select particular branches of the decision tree to take (such as in the case of the decision tree of FIG. 10 based on the make and model of the shoe), where different branches of the decision tree may be associated with different trained models. As another example, when the simple components are regressors, the real-valued outputs of the simple regressors may be combined arithmetically (e.g., computing the results of standard mathematical functions such as sums, averages, products, quotients, and the like) and may also be subject to activation functions (e.g., softmax, ReLU, and the like) to compute outputs that can be combined with other outputs.

In addition, while embodiments are described above with respect to complex classifiers for performing visual inspection of a particular type or category of item (e.g., shoes or pallets), embodiments of the present invention are not limited thereto. For example, in some embodiments of the present invention, a complex classifier may further identify a category of the object being analyzed, where the identified category may be from a collection of known categories of objects. This may be of use in the case of environments with heterogenous goods. For example, a heterogenous manufacturing line or logistics facility may process a wide range of different types of goods, such as shoes, boots, sporting equipment, clothing, food, beverages, and the like. In some embodiments, the identification of the category of the object may be output and displayed to a user on its own. In some embodiments, the identification of the category of the object may further be used within a decision tree of the complex classifier to perform further complex analysis of the object in accordance with the associated category. For example, detecting an item that is a shoe (as opposed to a piece of sporting equipment) results in following a branch of the decision tree or activating a decision tree that is associated with performing a complex inspection task on shoes, such as the decision tree shown in FIG. 10.

Some embodiments of the present invention are discussed above with respect to computing classifications corresponding to objects such as whether the object passes or fails a quality inspection and whether or not a pallet is non-stackable. Some aspects of embodiments of the present invention relate to identifying and computing one or more properties of the object based on the visual information. These properties may include whether or not the object is fragile (e.g., likelihood that the object is constructed of a known, crushable material such as glass) or detection of objects that likely contain liquids or hold hazardous materials. Based on the particular properties to be detected, various embodiments of the present invention may use a complex classifier to detect the properties. For example, in the case of logistics, detection of fragility of the contents of a package may include using a simple classifier that outputs a True value based on detecting text on the object identifying the contents as being fragile (e.g., detecting words such as: "fragile;" "glass;" "glassware;" "laboratory equipment;" and the like) and another simple classifier that searches a database for a shipping manifest associated with the object to determine the contents of the container, and matching keywords in the manifest against a list of materials that are known to be fragile. Likewise, detecting whether a container holds hazardous materials may include identifying labels on the exterior of the package indicating hazards such as icons for poison, ionizing radiation, biological hazards, carcinogens, "fire diamond" (NFPA 704), and the like. In the case of the "fire diamond," the individual numerals located in the red, blue, and yellow squares may be used to further identify the nature of the hazards of the material contained in the object.

Joint Training of Complex Classifiers

As discussed above, in some embodiments, the complex classifier may be characterized by a binary output as well, therefore its performance can be measured and optimized by means of a ROC curve. The performance of each simple classifier in terms of (TPr, FPr) pairs for the specific task is governed by a threshold which constitutes the free variable for the training of a complex classifier (or optimization of the complex classifier performance).

Therefore, according to one embodiment of the present invention, the training of a complex classifier that includes N simple classifiers can be framed as the optimization of the performances in terms of (TPr, FPr) pairs with respect to N free variables, i.e., the thresholds for the N simple classifiers.

For a given configuration of thresholds, a single (TPr, FPr) pair is obtained by aggregating the results of each of the simple classifiers by applying the aggregation logic defining the complex classifier itself. By independently varying the value of each threshold of each simple classifier, a set of (TPr, FPr) results is obtained.

Generally, the great majority of the explored configurations is sub-optimal in some forms: either there is a (TPr, FPr) pair that is characterized by same (or greater) TPr and same (or lower) FPr. The sub-optimal pairs are not interesting and are discarded.

The optimal or better performing thresholds can be formalized as a Pareto front (or frontier) (see, e.g., Kim, I. Y., & de Weck, O. L. (2005). Adaptive weighted-sum method for bi-objective optimization: Pareto front generation. *Structural and multidisciplinary optimization*, 29(2), 149-158.), i.e., the set of (TPr, FPr) pairs for which there is no other pair that has same or higher TPr with same or lower FPr.

Figure 12:
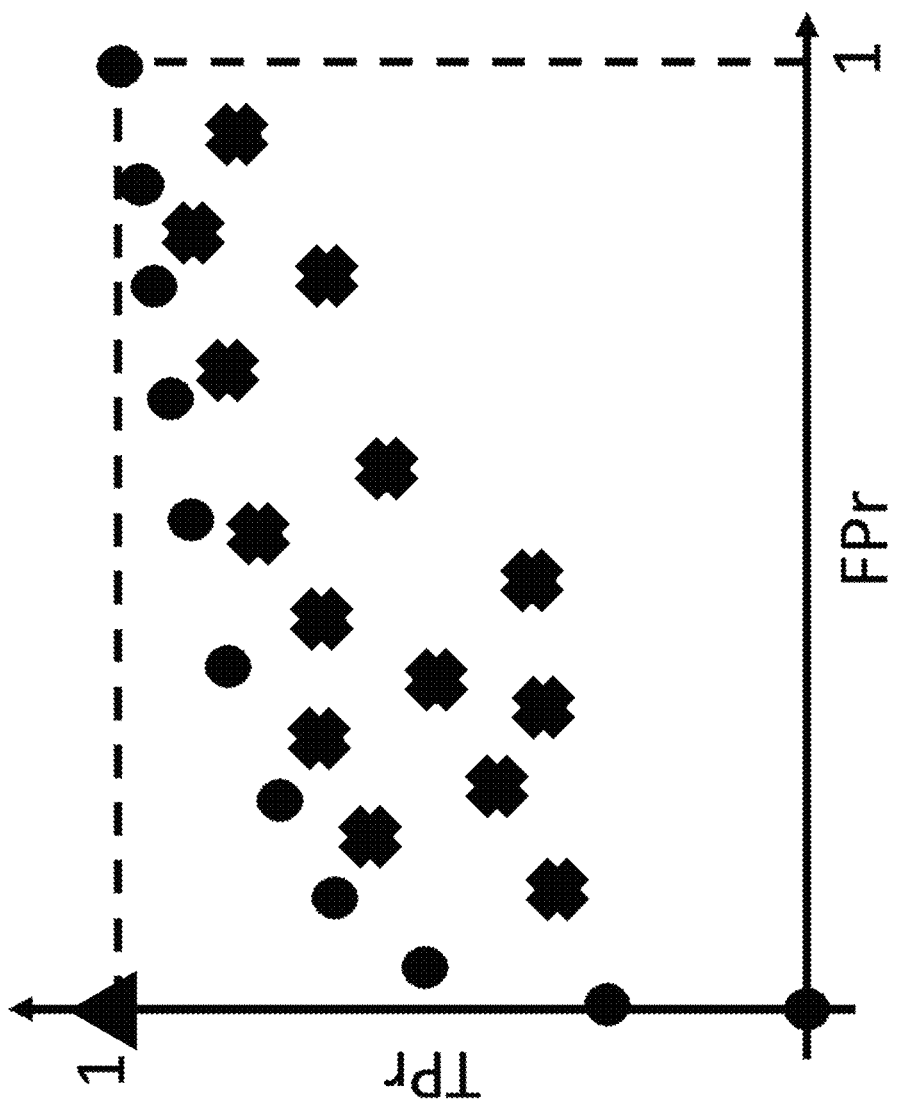
FIG. 12 is a visual representation of the Pareto front of FPr and TPr values for the configuration of the thresholds of the simple classifiers of a complex classifier according to one embodiment of the present disclosure.

FIG. 12 is a visual representation of the Pareto front of FPr and TPr values for the configuration of the thresholds of the simple classifiers of a complex classifier according to one embodiment of the present disclosure. As shown in FIG. 12, the Pareto front is depicted with circles, crosses correspond to sub-optimal, to-be-discarded points, and the triangle is the theoretical optimal value.

Figure 13:
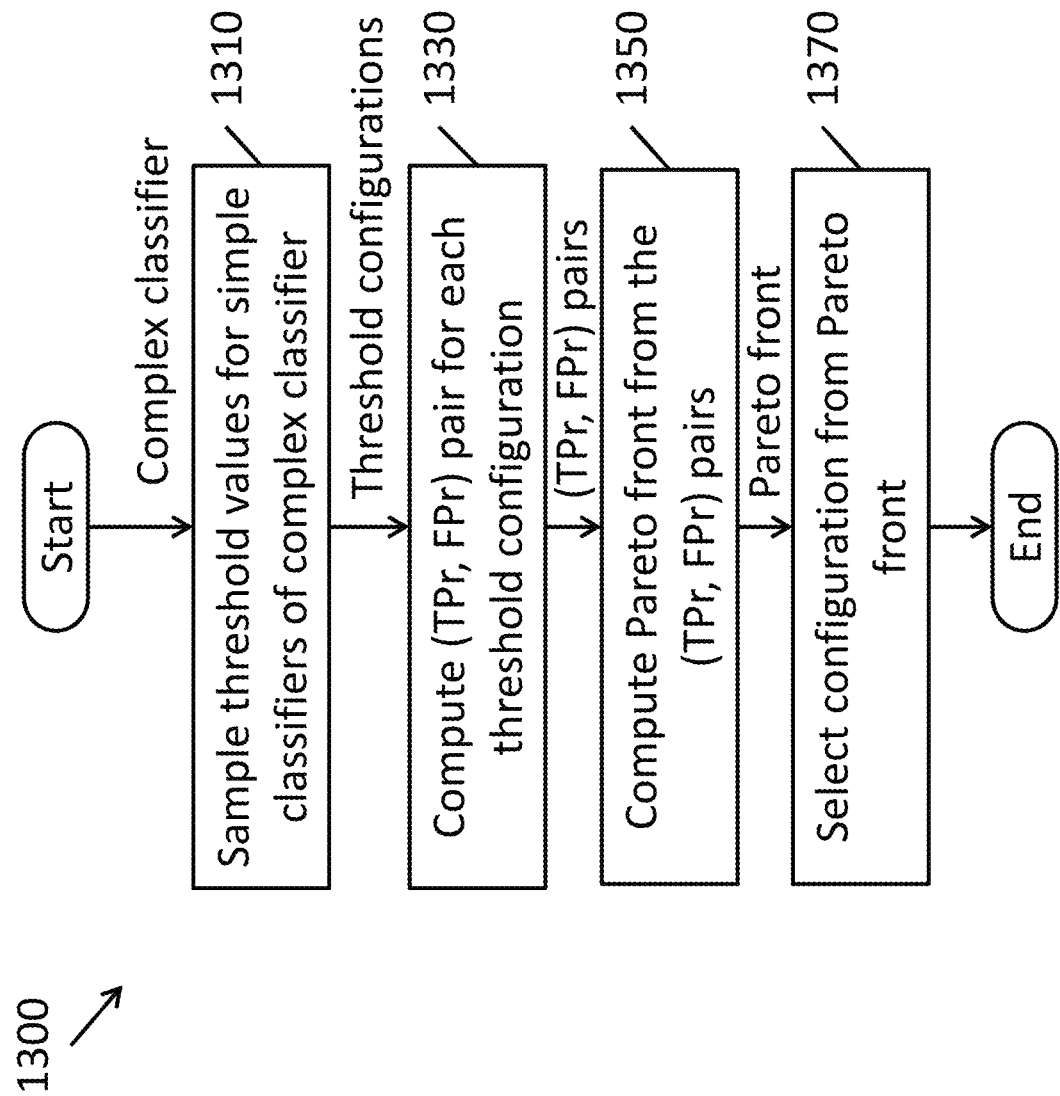
FIG. 13 is a flowchart of a method for training a complex classifier according to one embodiment of the present invention.

FIG. 13 is a flowchart of a method 1300 for training a complex classifier according to one embodiment of the present invention. A training system such as a computer system having a processor and memory storing labeled training data for the complex inspection task, is used to train the complex classifier by adjusting the thresholds associated with each of the simple classifiers of the complex classifiers. Referring to FIG. 13, in operation 1310, the training system samples (e.g., randomly selects) threshold values for each of the simple classifiers, to obtain C different configurations or sets of threshold parameters. In operation 1330, the training system computes the (TPr, FPr) pair of the complex classifier for each of the C simple classifier threshold configurations. The (TPr, FPr) pairs can be computed for each set of threshold values by applying the complex classifier, as configured by the set of threshold values, to a validation set of labeled data and measuring the TPr and FPr values on that validation set (e.g., a set of data disjoint from both the training data set and the test data set). In operation 1350, the training system computes the Pareto front from the C different (TPr, FPr) pairs.

The resulting Pareto front therefore identifies a collection of "best performing" or "optimal" models in accordance with (TPr, FPr) values of the complex system as a whole. In operation 1370, the training system applies a rule for selecting a configuration, from among the points in the Pareto front, for use by the configured system. In some embodiments, the particular rule used to select a particular one of the points on the Pareto front may be domain specific (e.g., in accordance with the acceptability of different types of errors in the domain in which the system is applied) and may be selected based on rules or heuristics specified by a user. For example, one problem could require that the maximum acceptable FPr is lower than 0.1, that the minimum TPr is 0.9. In some embodiments, more complex models accounting for "costs" of FPs and TPs are used and may select among the sets of configuration simple classifier thresholds on the Pareto front based on the economic- or business-related costs of making FP errors or TP errors.

Some aspects of embodiments of the present invention relate to various alternative techniques to compute threshold configurations for the simple classifiers using, for example, gradient-based optimization methods (see, e.g., Nocedal, J., & Wright, S. J. (2006). *Nonlinear Equations* (pp. 270-302). Springer New York.), branch and bound methods (see, e.g., Lawler, E. L., & Wood, D. E. (1966). Branch-and-bound methods: A survey. *Operations research,* 14(4), 699-719.), statistical sampling methods (see, e.g., Hastings, W. K. (1970). Monte Carlo sampling methods using Markov chains and their applications.), and partial optimization of simple classifiers.

Use of Complex Classifiers in Inference

The resulting configured complex inspection task classifier or complex classifier can then be deployed in an appropriate setting such as a manufacturing facility for performing defect analysis or in a logistics warehouse for performing analyses of the goods and packages passing through the warehouse.

As noted above, embodiments of the present invention may be implemented on an analysis system 300 including a processor and memory, where the analysis system 300 is configured to perform the complex classification task based on visual information captured by the scanning system 99 (e.g., based on images and/or a 3-D model). In addition, the analysis system Referring back to FIGS. 1A and 1B, in operation 540, the analysis system 300 outputs the results of the complex inspection of the object. These results may include the final classification of the object (e.g., a determination as to whether the stitching on a shoe is acceptable or a determination as to whether or not the item is NSP).

In the embodiment shown in FIG. 1A, the results are provided to a user device 400, which may be used to display the inspection results (e.g., the failure of the stitching of the shoes to pass the quality standards) on a display device 450 of the user device 400. According to some embodiments of the present invention, the user device 400 may also display additional information about the analysis, such as the detected make, model, color, and size of the shoe, as well as the retrieved example of the expected proper appearance of the stitching. This allows a human operator using the user device 400 to understand the process by which the complex classifier arrived at the classification, because the outputs of the various simple classifiers in the decision tree are also shown on the display.

As another example, in the case of the non-stacking pallets, the user device 400 may display the outputs of the individual simple classifiers 1110, 1120, 1130, 1140, such that a user can understand the individual separate determinations made by the simple classifiers when the complex classifier made its final judgment. This allows a user to override the decisions made by the system when the system has made an error. For example, the system may erroneously determine that the package is not on a pallet because the pallet may be painted or stained in an usual color that made it undetectable, or because some of the text on the package was erroneously recognized as being non-stackable.

In contrast, comparative machine learning systems that are trained to perform the classification based on a single, monolithic classifier (e.g., without applying logical outputs to combine the classifications or regression outputs of separate classifiers or regressors) may obscure the underlying reason for the classification, making it difficult for a user or operator to determine whether the system detected an aspect that the user did not, or if the system made a classification error.

Furthermore, as noted above, aspects of embodiments of the present invention apply transfer learning to allow multiple, different trained machine learning models to share a common set of input features, such as an input feature map computed by a shared convolutional neural network. This sharing of the computation of a feature map or feature vector from raw input data (e.g., images captured by the scanning system 99) reduces the processing requirements of performing the complex inspection task, thereby reducing power consumption and/or latency of the system.

As such, aspects embodiments of the present invention provide systems and methods for automatically performing complex visual inspection tasks involving applying logical and/or arithmetic operations to combine the results of simple visual classification tasks. Embodiments of the present invention enable improved computational efficiency and improve the explainability of the results of the model, thereby improving the ability of users to identify and to override errors made by the automatic visual inspection system.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method for performing automatic visual inspection, comprising:
    capturing visual information of an object using a scanning system comprising a plurality of cameras;
    extracting, by a computing system comprising a processor and memory, one or more feature maps from the visual information using one or more feature extractors;
    classifying, by the computing system, the object by supplying the one or more feature maps to a complex classifier to compute a classification of the object, the complex classifier comprising:
        a plurality of simple classifiers, each simple classifier of the plurality of simple classifiers being configured to compute outputs representing a characteristic of the object and one or more of the simple classifiers comprising a K-ary output, where K is greater than two,
        a decision tree connecting each simple classifier of the plurality of simple classifiers, wherein:
            the K-ary output selects particular branches of the decision tree to take, and
            different branches of the decision tree are associated with different trained models, and
        one or more logical operators configured to combine the outputs of the simple classifiers to compute the classification of the object; and
    outputting, by the computing system, the classification of the object as a result of the automatic visual inspection.

2. The method of claim 1, wherein the one or more feature extractors comprise one or more convolutional neural networks.

3. The method of claim 1, wherein the plurality of simple classifiers comprises one or more neural networks.

4. The method of claim 3, wherein the plurality of simple classifiers comprises one or more support vector machines.

5. The method of claim 4, wherein at least one logical operation is configured to combine an output of the one or more neural networks and an output of the one or more support vector machines.

6. The method of claim 1, wherein the plurality of simple classifiers comprises one or more regression model.

7. The method of claim 1, wherein the plurality of simple classifiers comprises one or more label-based classifier configured to perform on text detection.

8. The method of claim 1, wherein each simple classifier of the plurality of simple classifiers is configured by a corresponding threshold parameter of a plurality of threshold parameters.

9. The method of claim 8, wherein the plurality of threshold parameters are jointly trained.

10. The method of claim 1, wherein the scanning system comprises:
- a time-of-flight depth camera;
- a structured light depth camera;
- a stereo depth camera comprising at least two color cameras;
- a stereo depth camera comprising at least two color cameras and a color projector;
- a stereo depth camera comprising at least two infrared cameras; or
- a stereo depth camera comprising at least two infrared cameras, an infrared projector; and a color camera.

11. A computer system for performing automatic visual inspection, comprising:
- one or more processors; and
- one or more computer-readable media having stored thereon executable instructions that when executed by the one or more processors configure the computer system to perform at least the following:
  - capture visual information of an object using a scanning system comprising a plurality of cameras;
  - extract one or more feature maps from the visual information using one or more feature extractors;
  - classify the object by supplying the one or more feature maps to a complex classifier to compute a classification of the object, the complex classifier comprising:
    - a plurality of simple classifiers, each simple classifier of the plurality of simple classifiers being configured to compute outputs representing a characteristic of the object and one or more of the simple classifiers comprising a K-ary output, where K is greater than two,
    - a decision tree connecting each simple classifier of the plurality of simple classifiers, wherein:
      - the K-ary output selects particular branches of the decision tree to take, and
      - different branches of the decision tree are associated with different trained models, and
    - one or more logical operators configured to combine the outputs of the simple classifiers to compute the classification of the object; and
  - output, by the computing system, the classification of the object as a result of the automatic visual inspection.

12. The computer system of claim 11, wherein the one or more feature extractors comprise one or more convolutional neural networks.

13. The computer system of claim 11, wherein the plurality of simple classifiers comprises one or more neural networks.

14. The computer system of claim 13, wherein the plurality of simple classifiers comprises one or more support vector machines.

15. The computer system of claim 14, wherein at least one logical operation is configured to combine an output of the one or more neural networks and an output of the one or more support vector machines.

16. The computer system of claim 11, wherein the plurality of simple classifiers comprises one or more regression model.

17. The computer system of claim 11, wherein the plurality of simple classifiers comprises one or more label-based classifier configured to perform on text detection.

18. The computer system of claim 11, wherein each simple classifier of the plurality of simple classifiers is configured by a corresponding threshold parameter of a plurality of threshold parameters.

19. The computer system of claim 18, wherein the plurality of threshold parameters are jointly trained.

20. The computer system of claim 11, wherein the scanning system comprises:
- a time-of-flight depth camera;
- a structured light depth camera;
- a stereo depth camera comprising at least two color cameras;
- a stereo depth camera comprising at least two color cameras and a color projector;
- a stereo depth camera comprising at least two infrared cameras; or
- a stereo depth camera comprising at least two infrared cameras, an infrared projector; and a color camera.

* * * * *